(12) United States Patent
Yano

(10) Patent No.: US 6,910,772 B2
(45) Date of Patent: Jun. 28, 2005

(54) IMAGE DISPLAY APPARATUS

(75) Inventor: Tomoya Yano, Kanagawa (JP)

(73) Assignee: Sony Corporation, Tokyo (JP)

( * ) Notice: Subject to any disclaimer, the term of this patent is extended or adjusted under 35 U.S.C. 154(b) by 95 days.

(21) Appl. No.: 10/136,671

(22) Filed: May 1, 2002

(65) Prior Publication Data
US 2003/0002151 A1 Jan. 2, 2003

(30) Foreign Application Priority Data
May 1, 2001 (JP) ..................................... P2001-134535

(51) Int. Cl.[7] ............................................... G03B 21/28
(52) U.S. Cl. .......................................... 353/20; 353/98
(58) Field of Search .............................. 353/20, 98, 31, 353/122

(56) References Cited

U.S. PATENT DOCUMENTS

| | | | | |
|---|---|---|---|---|
| 5,535,054 A | * | 7/1996 | Shibuya | 359/487 |
| 5,833,341 A | * | 11/1998 | Kimura et al. | 353/98 |
| 5,853,240 A | * | 12/1998 | Tanaka et al. | 353/20 |
| 6,024,451 A | * | 2/2000 | De Vaan et al. | 353/20 |
| 6,042,237 A | * | 3/2000 | De Vaan et al. | 353/38 |
| 6,111,700 A | * | 8/2000 | Kobayashi et al. | 359/627 |
| 6,375,327 | * | 4/2002 | Holman et al. | 353/20 |

* cited by examiner

Primary Examiner—William C. Dowling
(74) Attorney, Agent, or Firm—Sonnenschein, Nath & Rosenthal, LLP

(57) ABSTRACT

An image display apparatus of a projection-type is provided which includes an illuminator with a light source, an optical modulator illuminated by light illuminator and which makes spatial modulation of the illumination light according to a to-be-displayed image for either transmission or reflection, and a projection lens to form an image of the optical modulator. The apparatus includes also a first reflecting element to reflect, towards the light source, the unwanted light of the light beam emitted from the illuminator and which will not illuminate the optical modulator, and a second reflecting element to guide, by reflecting, the unwanted light once reflected by the first reflecting element. In the apparatus, the combination of the light source and illuminator, which can recycle the unwanted light efficiently in the projector, makes it possible to inexpensively separate and recombine polarized components of the light beam. Use of a single-plate optical modulator formed from a color filter permits to utilize the light with an improved efficiency. Also by adopting a single-plate optical modulator of a sequential color-type, it is possible to attain an improved efficiency of light utilization. Thus, the efficiency of light utilization of an optical modulator whose numerical aperture is small can be improved and the peak brightness on a dark screen can be elevated.

11 Claims, 24 Drawing Sheets

OPTIC AXIS IS DISLOCATED

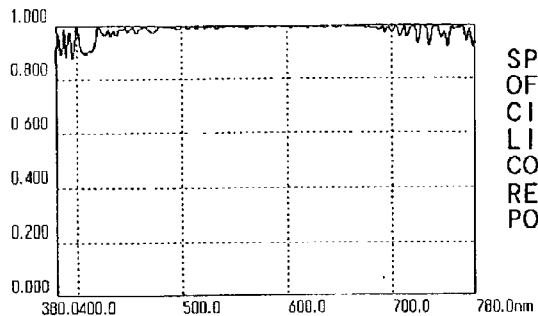

FIG.31A SPECTRAL TRANSMITTANCE OF COUNTERCLOCKWISE CIRCULARLY POLARIZED LIGHT WHEN ANTI-REFLECTION COATING IS FORMED ON REFLECTING CIRCULAR POLARIZER

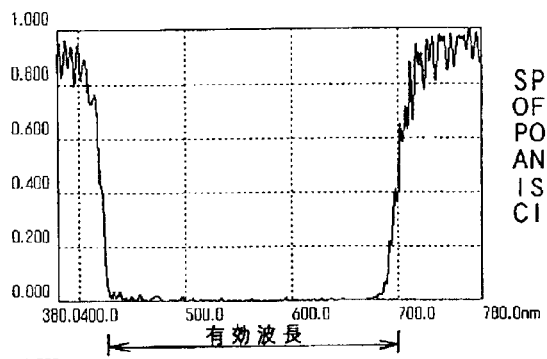

FIG.31B SPECTRAL TRANSMITTANCE OF CLOCKWISE CIRCULARLY POLARIZED LIGHT WHEN ANTI-REFLECTION COATING IS FORMED ON REFLECTING CIRCULAR POLARIZER

有効波長

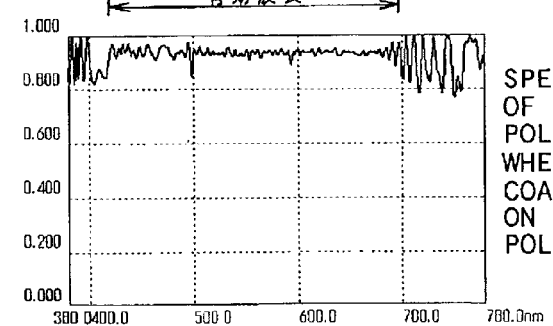

FIG.31C SPECTRAL TRANSMITTANCE OF COUNTERCLOCKWISE CIRCULARLY POLARIZED LIGHT WHEN ANTI-REFLECTLON COATING IS NOT FORMED ON REFLECTING CIRCULAR POLARIZER

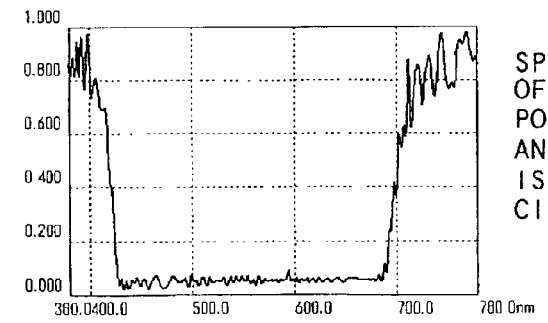

FIG.31D SPECTRAL TRANSMITTANCE OF CLOCKWISE CIRCULARLY POLARIZED LIGHT WHEN ANTI-REFLECTION COATING IS NOT FORMED ON REFLECTING CIRCULAR POLARIZER

IMAGE DISPLAY APPARATUS

BACKGROUND OF THE INVENTION

1. Field of the Invention

The present invention generally relates to an image display apparatus, and more particularly, to a projection-type image display apparatus including an optical modulator which is illuminated by light from an illuminator, and a projection lens which forms the modulated light from the optical modulator into an image.

2. Description of the Related Art

A typical one of the conventional projection-type image display apparatuses includes an illuminator, optical modulator (will be referred to simply as "modulator" hereunder) illuminated by light from the illuminator, and a projection lens which forms the modulated light from the modulator into an image. The conventional image display apparatus uses a discharge lamp as the light source of the illuminator, and a liquid crystal as the modulator, and has a relatively large size.

Since the image display apparatus of the above type adopts a color filter for each pixel of one modulator and a so-called sequential color display method by which an image is displayed in colors on the time-shared basis, so it is inexpensive. However, the apparatus is not advantageous in that it cannot utilized light efficiently and consumes much power.

The reason why the apparatus cannot utilize the light with a high efficiency is that since the modulator is a non-luminous element which modulates the polarized state of incident light, a means is needed which splits a light beam emitted from a light source into rays of light according to the polarized state of each ray and then recombines the split rays of light together, the light source emits light even when an image is displayed in black, which is different from a luminous-type image display apparatus, and the apparatus loses light correspondingly to an light-utilization efficiency which depends upon the numerical aperture of the modulator.

For a higher efficiency of light utilization in the conventional image display apparatus, the following are done by the optical elements etc. included in the image display apparatus.

[Splitting and Recombination of Polarized Light Components]

Referring now to FIG. 1, a conventional image display apparatus is schematically illustrated in the form of an axial-sectional view. The above-mentioned means for splitting a light beam emitted from a light source in an illuminator into rays of light according to the polarized state of each ray and then recombining the split rays of light together is known as a polarized-state converter. As shown, the illuminator used in the image display apparatus includes a light source 101, modulator 102, and a P-S converter 103 provided, as the polarized-state converter, between the light source 101 and modulator 102. The P-S converter 103 is formed as shown in FIG. 2. Namely, a glass block 108 is prepared by attaching glass plates 105 each having formed thereon a polarized component splitting layer 104 formed from a multilayer film of an inorganic substance and glass plates 107 each having a reflecting surface 106 formed thereon alternately to each other. The glass block 108 thus formed is sliced along cutting planes 109 laid obliquely in relation to the joined surfaces of the glass plates 105 and 107 to make P-S converter plates.

A light beam being a mixture of P- and S-polarized components, projected onto the P-S converter 103, is separated by the polarized component splitting layer into P- and S-polarized components. So, the P- and S-polarized components split by each of the layers of the P-S converter 103 will go out of the P-S converter 103. With a half-wave ($\lambda/2$) plate 110 provided at a portion of the P-S converter 103 at which the light will go out and corresponding to either the S- or P-polarized ray of light, the P-S converter 103 provides a light beam including solely either the P- or S-polarized component.

Use of the P-S converter 103 and half-wave plate 110 as a polarized component splitter permits to improve the efficiency of light utilization of the illuminator used to illuminate the modulator which modulates polarized components of an incident light.

In the above illuminator, a light beam emitted from the light source 101 is reflected by a parabolic mirror 111 and incident upon the P-S converter 103 through a pair of fly-eye lenses 112 and 113. Then, it passes through the half-wave ($\lambda/2$) 110 and a condenser lens 114 and reaches the modulator 102.

[Reflecting Polarizer]

The conventional polarizer allows only one of two types of polarized components of an incident light to pass through while absorbing the other type of polarized component. However, there has been proposed a "reflecting polarizer" which allows one of two types of polarized components of an incident light to pass through while reflecting, not absorbing, the other type of polarized component. Use of such a "reflecting polarizer" as the polarized-state converter permits to utilize the other type of polarized component of the incident light by reflecting it again, that is, to improve the efficiency of light utilization.

[Linear Polarizer Using a Birefringent Multilayer Film]

Also, there has been proposed a linear polarizer using a birefringent multilayer film formed by laminating two types of polymer films each being anisotropic in refractive index and different in refractive index from each other and elongating the laminated films. In the linear polarizer, the laminated two types of polymer films are completely coincident in refractive index with each other in the direction of one of axes of polarization while being not coincident in the direction of the other polarization axis. By adjusting the different refractive indexes, it is possible to pass the polarized light in the direction of one of the polarization axes while reflecting the polarized light in the direction of the other polarization axis perpendicular to the one polarization axis. Thus, the "reflecting polarizer" can be provided.

Note that the above "reflecting polarizer" is commercially available from the 3M under the trade name "DBEF" or "HMF".

[Circular Polarizer Using a Cholestetric Liquid Crystal]

As well known, the cholesteric liquid crystal selectively reflects light beams. There has been proposed a circular polarizer utilizing the property of the cholesteric liquid crystal to selectively reflect light beams. As disclosed in the Japanese Published Unexamined Application No. 281814 of 1994, since the cholesteric liquid crystal has a pitch varying by more than 100 nm, it can selectively reflect light beams having wavelengths over the visible range. Also, a wavelength-independent circular polarizer can be produced using such a cholesteric liquid crystal polymer-made circular polarizer.

The circular polarizer formed from the cholesteric liquid crystal polymer and polarized-state converter using the circular polarizer are known from he disclosure in the Japanese Patent Gazette No. 2,509,372. The invention disclosed in this Gazette utilizes the fact that because of the characteristic of the circularly polarized light, namely, since the phase changes 180 deg. per reflection, a right-hand circularly polarized light is converted to a left-hand one while a left-hand circularly polarized light is converted to a right-hand one. As shown in FIG. 3, the reflector or parabolic mirror 111 can be combined with a cholesteric liquid crystal polymer layer 115 to build a polarized component splitting/recombination unit. The polarized component splitting/recombination unit using the above linear polarization needs a half-wave ($\lambda/2$) plate, but the polarized component splitting/recombination unit using the circular polarization needs no such half-wave plate.

More specifically, a light beam emitted from the light source 101 is incident upon the cholesteric liquid crystal polymer layer 115 through a condenser lens 116, while being reflected by the reflector or parabolic mirror 111 and incident upon the cholesteric liquid crystal polymer layer 115 through the condenser lens 116. At the cholesteric liquid crystal polymer layer 115, the circularly polarized light in one direction will be allowed to pass through while the circularly polarized light in the other direction will be reflected. The circularly polarized light in the other direction, thus reflected by the cholesteric liquid crystal polymer layer 115, is reflected by the reflector or parabolic mirror 111 to a circularly polarized light in the one direction, incident again upon the cholesteric liquid crystal polymer layer 115 and passed through the latter.

However, the conventional image display apparatus including the aforementioned illuminator is not advantageous in the following respects:

[Manufacturing Process]

The aforementioned illuminator can only be manufactured in a complicated process and with high costs.

[Problems of the Circular Polarizer Using the Cholesteric Liquid Crystal Polymer]

The circular polarizer disclosed in the aforementioned Japanese Published Unexamined Application No. 281814 of 1994 are independent of any light wavelength, but cannot be said to satisfactorily split an incident light into polarized components. Therefore, to provide an image having a required contrast, the illuminator has to be used in combination with an absorbing polarizer (where one of the polarized components is allowed to pass through while the other polarized component is absorbed). Thus, it is difficult to utilize light with an improved efficiency.

[Problems of the Polarized Component Separator Using the Cholesteric Liquid Crystal Polymer-made Circular Polarizer]

The illuminators shown in FIG. 3, disclosed in the aforementioned Japanese Patent Gazette No. 2,509,372 and Japanese Published Unexamined Application No. 281814 of 1994, respectively, are not always effective as expected when it is built in the form of a combination of a discharge lamp used as a light source in practice and a reflector or when it is used to illuminate the modulator.

More specifically, as shown in FIG. 4, the reflector 111 used with the discharge lamp has the actual sectional form of a paraboloid of revolution or an ellipsoid of revolution, and so a light beam reflected by a polarized component splitter formed from the cholesteric liquid crystal polymer layer 115 towards the light source 101 will be reflected twice by the reflector 111. On the assumption that the light beam has a phase change of 180 deg. when it is reflected once by the reflector 111, the phase change of 180 deg. given to the light beam reflected once will be canceled, namely, the light beam once reflected will have no phase change, when it is reflected once again.

Further, since the P- and S-polarized components of light are reflected with one reflectance and another, respectively, by the reflector 111 and they are changed in phase and scattered when they pass through the glass tube of the discharge lamp as the light source 101, so the polarized-state conversion will be less effective. Also, when the reflector is a parabolic mirror, a light beam emitted from the focal point will return to that point after it is reflected by a reflecting polarizer, but a light beam emitted from other than the focal point will not always return to that point after it is reflected by the reflecting polarizer.

Also, as shown in FIG. 5, when a spheroidal mirror is used as the reflector 111, the reflected light from the cholesteric liquid crystal polymer layer 115 will not return, to the point of light emission of the light source 101 but will be absorbed by the electrodes of the discharge lamp and have the angular distribution thereof spread after it is reflected by the reflector 111, which depends upon the position of the cholesteric liquid crystal polymer layer 115. The spread angular distribution will increase the Etendue of the light source, which will cause the efficiency of light utilization to be lower.

As above, the polarized-state converter in the conventional illuminator is disadvantageous in efficiency of light utilization and manufacturing cost, and cannot return light to the light source with any adequate efficiency.

SUMMARY OF THE INVENTION

It is therefore an object of the present invention to overcome the above-mentioned drawbacks of the prior art by providing an image display apparatus including a non-luminous modulator, illuminator to illuminate the optical modulator and a projection lens, and which is simply constructed, thus easy to produce and can utilize light with an improved efficiency.

The above object can be attained by providing a projection-type image display apparatus having an illuminator with a light source, optical modulator illuminated by light from the illuminator and which makes spatial modulation of the illumination light according to a to-be-displayed image for either transmission or reflection, and a projection lens to form the modulated light from the optical modulator into an image, the apparatus including:

a first reflecting element to reflect, towards the light source, unwanted one of a light beam emitted from the illuminator and that will not illuminate the optical modulator; and a second reflecting element to guide, by reflecting, the unwanted light once reflected by the first reflecting element to the optical modulator.

In the above image display apparatus, the unwanted light is reflected back to the light source by the first and second reflecting elements and also guided to the optical modulator, whereby the light emitted from the light source can be utilized with an improved efficiency.

BRIEF DESCRIPTION OF THE DRAWINGS

These objects and other objects, features and advantages of the present invention will become more apparent from the following detailed description of the preferred embodiments of the present invention when taken in conjunction with the accompanying drawings, in which:

FIG. 31A shows the spectral transmittance of left-hand circularly polarized light in case the anti-reflection coating is formed on the reflecting circular polarizer in the first embodiment of the image display apparatus according to the present invention, FIG. 31B shows the spectral transmittance of right-hand circularly polarized light in case the anti-reflection coating is formed on the reflecting circular polarizer, FIG. 31C shows the spectral transmittance of left-hand circularly polarized light in case the anti-reflection coating is not formed on the reflecting circular polarizer, and FIG. 31D shows the spectral transmittance of right-hand circularly polarized light in case the anti-reflection coating is not formed on the reflecting circular polarizer;

FIG. 33B shows the theory of illumination of the illuminator in FIG. 37A;

DETAILED DESCRIPTION OF THE PREFERRED EMBODIMENTS

Note that through the accompanying drawings, like parts are indicated with corresponding references.

[General-purpose Illuminator]

Figure 6:
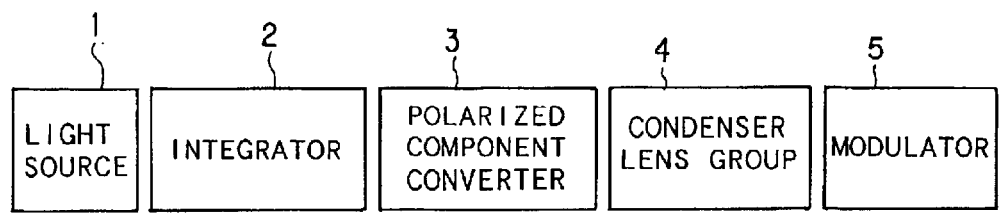
FIG. 6 is a schematic block diagram of the projection-type image display apparatus according to the present invention.

Referring now to FIG. 6, there is schematically illustrated in the form of a block diagram the projection-type image display apparatus according to the present invention. The image display apparatus shown in FIG. 6 includes a general-purpose illuminator using an optical modulator (will be referred to simply as "modulator" hereunder) which modulates a polarized state of an incident light. As shown, the basic illuminator includes a light source 1, integrator 2, polarized-state converter 3, condenser lens group 4, and a modulator 5. Illumination light emitted from the illuminator is incident upon the modulator 5. Also, in some cases, there is provided a color separator between the polarized-state converter 3 and modulator 5 correspondingly to the modulator 5 for display of an image in three primary colors (R, G and B).

The integrator 2 is provided to uniform the light intensity distribution within the light beam emitted from the light source 1. The polarized-state converter 3 splits the light beam emitted from the light source 1 into polarized components and recombines the thus split polarized components. The condenser lens group 4 is provided to illuminate the modulator 5 efficiently by the light beam from the integrator 3. That is, the condenser lens group 4 forms the light from the integrator 2 into an image on the modulator 5.

[Outline of the Image Display Apparatus According to the Present Invention]

According to the present invention, the image display apparatus further includes a first reflecting element provided to reflect the unwanted light of the light beam emitted from the light source 1, not illuminating the modulator 5, towards the light source 1, and a second reflecting element provided to reflect the light beam once reflected by the first reflecting element toward the modulator 5. Since these reflecting elements permit to reuse the unwanted light as illumination light, so they permit to display an image more brightly without having to increase the light-emission power of the light source 1 itself.

The above-mentioned illuminator permitting to reuse the unwanted light as illumination light will be referred to as "recycle-type illuminator" hereunder. According to the present invention, the following image display apparatuses can be build using the "recycle-type illuminator":

(1) Image display apparatus with polarizing recycle-type illuminator
(2) Image display apparatus with illuminator capable of effectively improving numerical aperture of modulator
(3) High-efficiency single-plate color image display apparatus
(4) High-efficiency sequential color image display apparatus
(5) Image display apparatus with improved peak brightness

[Basic Type of Recycle-type Illuminator]

Figure 7:
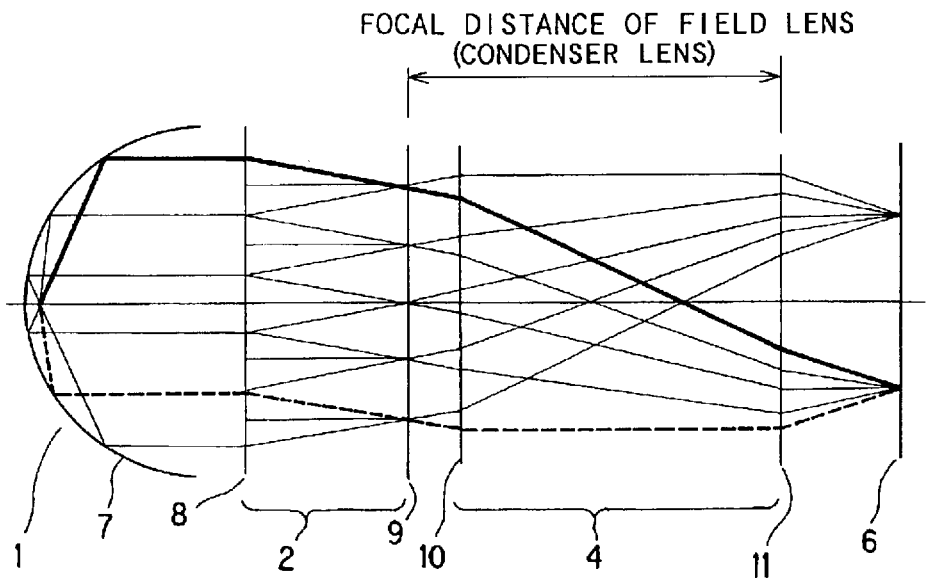
FIG. 7 is a side elevation of the illuminator included in the image display apparatus shown in FIG. 6, showing the basic optical path in the illuminator.

As shown in FIG. 7, the recycle-type illuminator includes an illumination optical system consisting of the light source 1, integrator 2, polarized-state converter (not shown) and the condenser lens group 4, and also a first reflecting element 6. In this illuminator, the light source 1 is a discharge lamp provided with a parabolic mirror 7 which is a reflecting mirror 7 having the sectional form of a paraboloid of revolution. The light-emission point of the discharge lamp is laid at the focal point of the parabolic mirror 7. The integrator 2 is a fly-eye integrator which is a combination of a first fly-eye lens 8 and second fly-eye lens 9. The integrator 2 is followed by the polarized-state converter (not shown). The condenser lens group 4 consists of a condenser lens 10 and field lens 11. The first reflecting element 6 is shown as a plane mirror laid perpendicularly to the optic axis of the illuminator.

Note that in the following description, the light beam traveling from the light source 1 to the first reflecting element 6 will be referred to as "primary light" while the light beam having been reflected by the first reflecting element 6 will be referred to as "recycled light". In FIG. 7, the typical rays of the primary light are indicated with solid lines, and the recycled light corresponding to the primary light is indicated with a dashed line.

More specifically, the primary light emitted from the point of light emission of the discharge lamp is laid at the focal point of the parabolic mirror 7, and the primary light emitted from the light-emission point is reflected by the parabolic mirror 7 to be a collimated beam which will be perpendicularly incident upon the first fly-eye lens 8 of the fly-eye integrator. Then, the primary light is converged by each of segments of the first fly-eye lens 8 and condensed onto each of segments of the second fly-eye lens 9. That is, the light-source image carried by the primary light is formed on each of the segments of the second fly-eye lens 9. The primary light reaches the first reflecting element 6 through the second fly-eye lens 9 and condenser lens group 4. In this illumination optical system, the central rays of light are parallel to the optic axis, namely, perpendicular to the first reflecting element 6. That is, the illumination optical system is a telecentric optical system.

It should be reminded that each of the segments of the first fly-eye lens 8 is conjugate with the first reflecting element 6 and the second fly-eye lens 9 is conjugate with the light-emission point of the light source 1. That is, each of the segments of the first fly-eye lens 8 works as a diaphragm.

The recycled light reflected by the first reflecting element 6 returns to the fly-eye integrator. Of the recycled light, a light beam passed through a zone of the second fly-eye lens 9 within which the primary light has passed and that has also passed through the corresponding first fly-eye lens 8, will be focused at the point of light emission.

Note that since actually the parabolic mirror 7 is limited in size and a glass bulb forming the light source 1 will shade the light beam, the recycled light will be shaded in the process of returning to the point of light emission.

[Illuminator Permitting to Recycle Light with Improved Efficiency]

Figure 8:
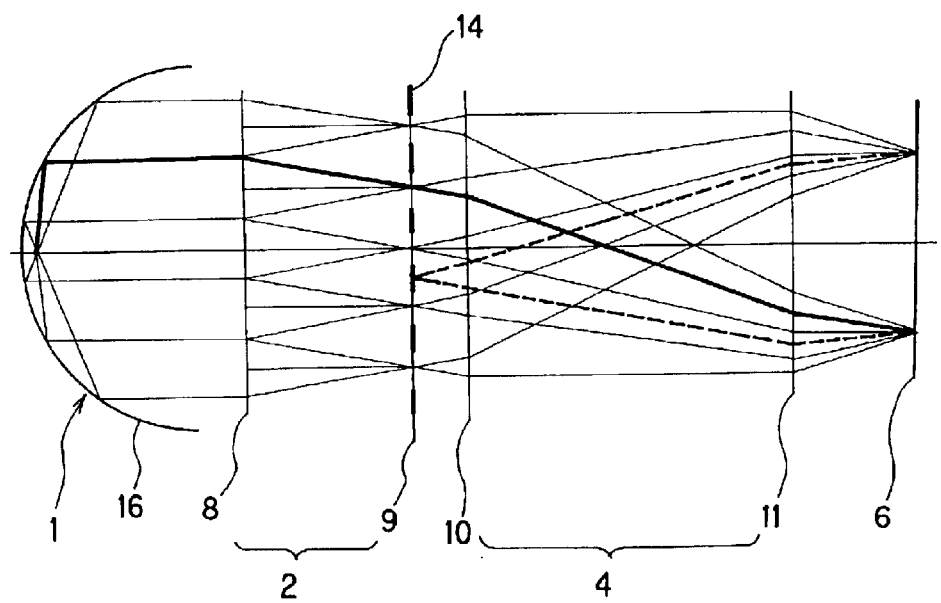
FIG. 8 is a side elevation of the illuminator included in the image display apparatus in FIG. 6, showing the optical path in the illuminator in which the reflecting element is laid obliquely in relation to the basic optical path.

FIG. 8 is a side elevation of the illuminator included in the image display apparatus according to the present invention. As shown, the first reflecting element 6 is laid obliquely in relation to the optic axis of the illuminator, and a reflector 14 is provided as a second reflecting element, whereby the illumination light can be recycled with an improved efficiency. The illuminator includes an illumination optical system consisting of the light source 1, integrator 2, polarized-state converter (not shown) and the condenser lens group 4, and also the first reflecting element 6. In this illuminator, the light source 1 is a discharge lamp provided with a spheroidal mirror 16 having the sectional form of an ellipsoid of revolution, and its light-emission point is at the focal point of the spheroidal mirror 16. The condenser lens group 4 is an assembly of two lenses: condenser lens (relay lens) 10 and field lens 11.

The reflector 14 serving also as a diaphragm is laid at the second focal point of the spheroidal mirror 16. The reflector 14 is formed from a highly reflective material, and has a pattern of apertures corresponding to rays of light going out of segments, respectively, of the second fly-eye lens 9 of the second integrator 2.

The image-side focal point of the condenser lens 10 is set near the field lens 11. In this illumination optical system, the central ray of light is parallel to the optic axis, namely, perpendicular to the first reflecting element 6. That is, the illumination optical system is a telecentric optical system. Since the first reflecting element 6 is laid obliquely in relation to the optic axis of the illumination optical system, the recycled light reflected by the first reflecting element 6 returns to a position off the aperture pattern of the reflector 14 which will reflect the reflected recycled light. The recycled light thus reflected by the reflector 14 returns to the first reflecting element 6. In FIG. 8, the typical rays of the primary light are indicated with solid lines, and the path of the recycled light corresponding to the primary light is indicated with a dashed line.

Figure 9:
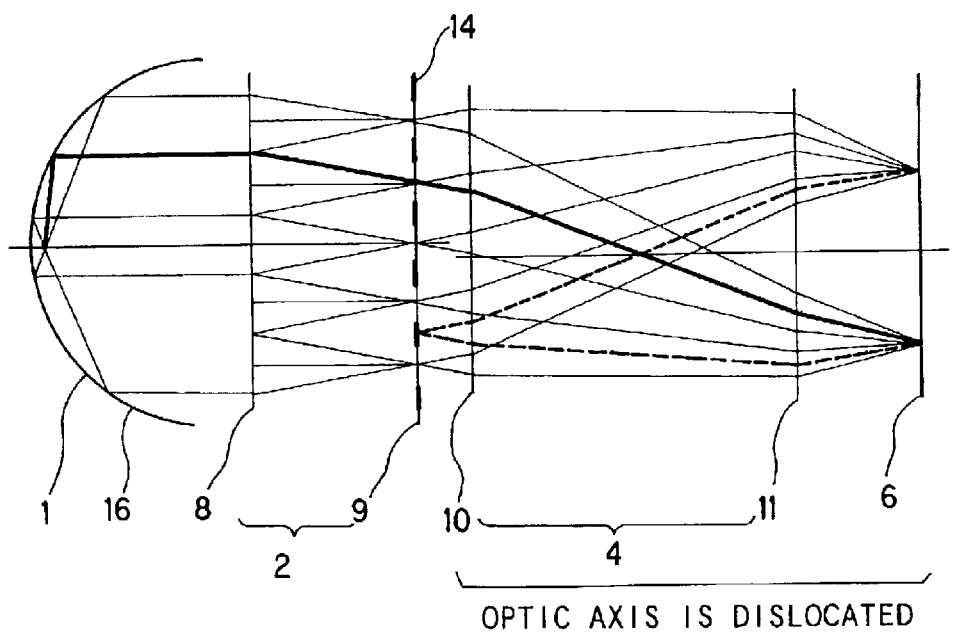
FIG. 9 is a side elevation of the illuminator included in the image display apparatus in FIG. 6, showing the optical path in the illuminator in which the optic axis of a part of the optical system is shifted from the basic optic axis.

Also, the illuminator may be constructed with the optic axis of the optical system laid downstream of the condenser lens 10 being shifted an appropriate distance as shown in FIG. 9. The appropriate distance of the optic axis shift is nearly a quarter of the pitch between the segments of the fly-eye integrator 2. Also in FIG. 9, the typical rays of the primary light are indicated with solid lines, and the path of the recycled light corresponding to the primary light is indicated with a dashed line.

In the illuminators shown in FIGS. 8 and 9, respectively, the diameter of the aperture of the reflector 14 generally depends upon the Etendue of an object to be illuminated by light from the illuminated, but it is determined taking in consideration the aspect ratio of the to-be-illuminated object and efficiency of light recycling.

Also, the second fly-eye lens 9 and reflector 14 are positioned to be generally conjugate with each other. That is, the recycled light reflected by the first reflecting element 6 defines, on the second fly-eye lens 9, a light intensity distribution different from that formed by the primary light, and the illumination pattern of each segment of the second fly-eye lens 9 is superposed on the reflector 14. For example, when the segments of the second fly-eye lens 9 have the same rectangular shape, the illumination pattern formed by the recycled light on the reflector 14 will be a rectangular one in which the illumination of the central aperture corresponding to each of the segments is low.

Also, the pattern of the reflected light from the first reflecting element 6 results in similar patterns on the segments of the first fly-eye lens 8. When the image-side focal point of the first fly-eye lens 8 is coincident with that of the condenser lens group 4, the reflected light from the first reflecting element 6 returns to a position symmetric with the coincident position with respect to the optic axis after reaching the first fly-eye lens 8. In case the first fly-eye lens 8 is laid symmetrically with respect to the optic axis, the symmetric pattern of the reflected light pattern will be formed on each of the segments of the first fly-eye lens 8, with the result that the first reflecting element 6 is illuminated with the illumination being not uniformed. To uniform the illumination, the field lens 11 and first fly-eye lens 8 should be spaced from each other. Since the rays of light other than the central one are not symmetric at the first fly-eye lens 8, so the illumination of the recycled light can be uniformed.

Figure 10:
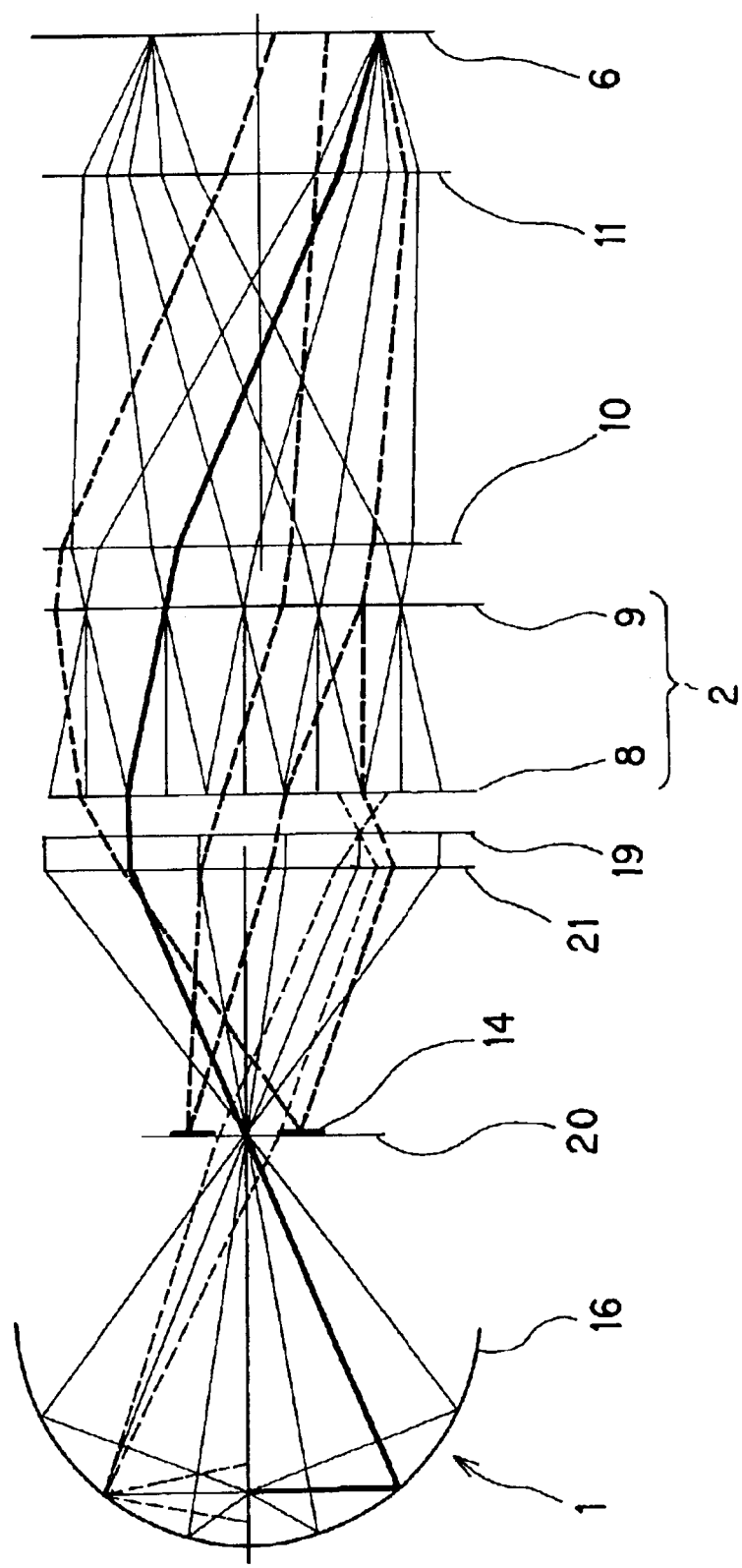
FIG. 10 is a side elevation of the optical system in the image display apparatus in FIG. 6, in which the optic axis of a part of the optical system is shifted from the basic optic axis.

The illuminator may be composed of the light source 1 with a spheroidal mirror 16, relay lens 20 laid at the second focal point of the spheroidal mirror 16, reflector 14 laid near the relay lens 20, field lens 21, reflecting polarizer 19, fly-eye integrator 2, condenser lens 10, field lens 11 and the first reflecting element 6 in this order as shown in FIG. 10. In this case, the optic axis of the optical system laid downstream of the condenser lens 10 can be shifted in parallel to the basic optic axis.

The reflector 14 is open at the center thereof. Namely, it works as a diaphragm for the relay lens 20.

In this illuminator, the recycled light reflected by the reflecting polarizer 19 passes through the field lens 21, relay lens 10 and spheroidal mirror 16 and returns to the light-emission point of the light source 1. The recycled light reflected by the first reflecting element 6 is reflected by the reflector 14 and returns to the first reflecting element 6. Also in FIG. 10, the typical rays of the primary light are indicated with solid lines and the path of the recycled light corresponding to the primary light is indicated with a dashed line.

[First Reflecting Element]

The first reflecting element has not to be any dedicated element. An element usable to reflect unwanted light for any other purpose may be employed as the first reflecting element. Namely, the first reflecting element may be any one of a reflecting polarizer, polarization beam splitter, shading layer, reflecting layer of a reflecting modulator, reflective color filter or the like. It will be described later where it should be positioned.

[Requirements for Improvement of Recycling Efficiency]

The requirements for improvement of the efficiency of recycling the illumination light includes the following four:

(1) The first reflecting element and integrator should be optically conjugate with each other.
(2) The illuminator components should reflect as little as possible at the surfaces thereof.
(3) The illuminator should be constructed to efficiently reflect the return light.
(4) The Etendue of the modulator should be so large as to allow the light source Etendue to increase in the process of light recycling.

The first requirement is as having previously been described.

To meet the above second requirement, it is necessary to form an anti-reflection coating on each optical component and minimize the reflecting surface by integrally forming parts which could be formed integrally with each other. For example, the discharge lamp bulb should desirably have such an anti-reflection coating formed on the glass surface thereof. Also, the P-S converter, condenser lens 10 and second fly-eye lens 9 of the fly-eye integrator shown in FIG. 7 should be laid optically close to each other.

The third requirement will be described later.

The "Etendue of the modulator" in the fourth requirement is represented by a product of an illuminated area of the modulator and a solid angle of the illumination light, and the "Etendue of the light source" is represented by a product of an area of light emission and a solid angle of the light emission. For example, in a light source consisting of a parabolic mirror and discharge lamp bulb, the "Etendue of the light source" is a product of an opening area of the parabolic mirror and an emission solid angle of the outgoing light at the opening of the parabolic mirror. The Etendue of the modulator will increase as the unwanted light is returned to the light source and reflected back towards the modulator. In case the Etendue of the modulator is smaller than that of the light source, the recycled light will illuminate a zone larger than a one intended to be illuminated and the efficiency of recycling will be smaller.

[Construction of the Light Source for Improved Efficiency of Recycling (1)]

Figure 11:
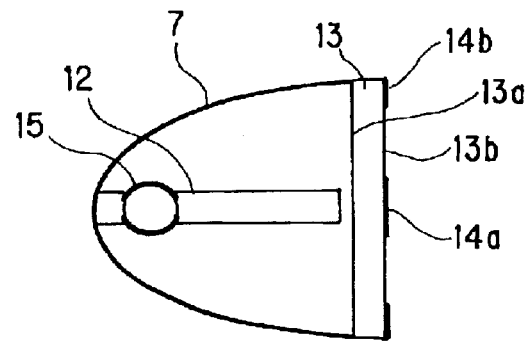
FIG. 11 is an axial-sectional view of a first embodiment of the light source included in the image display apparatus shown in FIG. 6.

Generally, in case the light source is provided with the parabolic mirror as above, the recycled light will not precisely coincide in position and angle with the primary light when the unwanted light returns to the opening of the parabolic mirror. Also, when the optical elements have been misaligned with each other in the process of manufacturing, the recycled light will not return to the light-emission point of the light source. The light source improved in these respects is shown in FIG. 11 which is an axial-sectional view of the first embodiment of the light source included in the image display apparatus according to the present invention. As shown, the light source with the parabolic mirror 7 additionally includes a protective glass (face plate) 13 provided at the open end of the mirror 7 and having reflectors 14a and 14b provided as the second reflecting element on the front side 13b or rear side 13a thereof. The reflectors 14a and 14b are positioned at the center and along the periphery, respectively, of the protective glass 13. Each of them may be a thin film or dielectric multilayer film of a metallic material such as aluminum, silver or the like formed on the protective glass 13. Alternatively, they may be reflectors separate from the protective glass 13 and located in the vicinity of the latter.

Note that the light-emission point is within the lamp bulb 12 (glass tube) having an anti-reflection coating 15 formed on the surface of the glass tube thereof.

Figure 12:
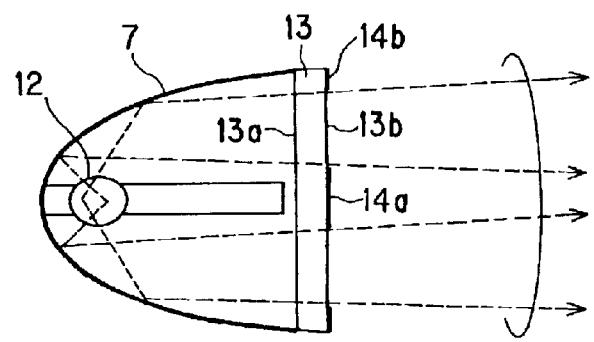
FIG. 12 is an axial-sectional view of a second embodiment of the light source included in the image display apparatus shown in FIG. 6.

Generally, in the light source consisting of the parabolic mirror 7 and lamp bulb 12, the entire open end of the parabolic mirror 7 is not effective as the light source but the center and periphery of the lamp bulb 12 are ineffective zones where the illumination light reflected by the parabolic mirror 7 will not be transmitted, as shown in FIG. 12. Namely, the reflectors 14a and 14b are provided in such ineffective zones.

Figure 13:
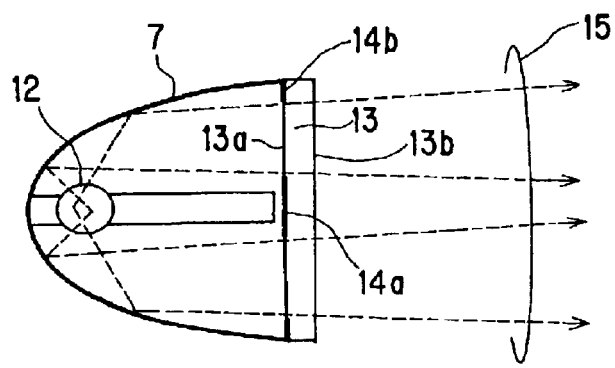
FIG. 13 is an axial-sectional view of a third embodiment of the light source included in the image display apparatus shown in FIG. 6.

The reflectors 14a and 14b should desirably be formed as close to the light-emission point of the light source as possible because a larger part of the recycled light will be shaded by the glass tube of the lamp bulb 12 if the reflectors 14a and 14b are apart from the light-emission point as shown in FIG. 12. To avoid this, the reflectors 14a and 14b should more desirably be positioned closer to the light-emission point, by forming them on the rear side 13a of the protective glass 13, than formed on the front side 13b of the protective glass 13, as shown in FIG. 13. Also, the reflectors 14a and 14b should desirably be positioned closer to the effective zone of the parabolic mirror 7. When the reflectors 14a and 14b are far from the effective zone of the parabolic mirror 7, the unwanted primary light (light emitted directly from the light-emission point) cannot be shaded sufficiently and thus a larger part of the reflected light to be returned towards the light source will be reflected.

Figure 14:
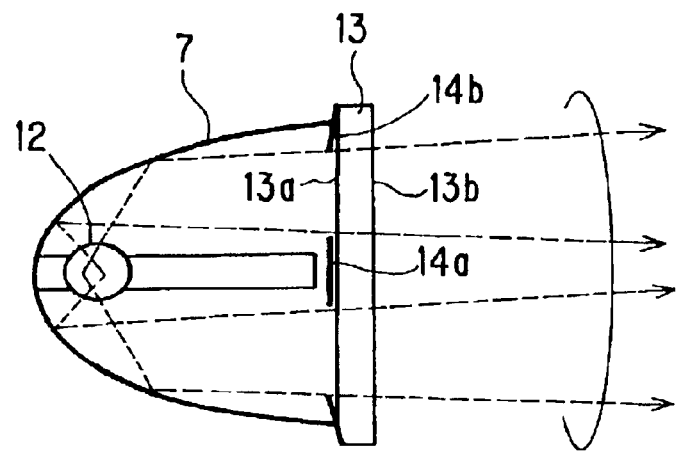
FIG. 14 is an axial-sectional view of a fourth embodiment of the light source included in the image display apparatus shown in FIG. 6.

Also note that the reflector 14b formed along the periphery of the protective glass 13 may be laid obliquely at an appropriate angle with the optic axis as shown in FIG. 14. That is, in this case, the reflector 14b is formed to be a part of a conical or spherical surface. In case the reflector 14b is not laid so obliquely, the light beam reflected by the reflector 14b will be incident upon a large radial zone of the first fly-eye lens 8. By positioning the reflector 14b obliquely in relation to the optic axis, it is possible to prevent the light beam reflected by the reflector 14b from diverging through the first fly-eye lens 8. It should be noted that the oblique angle of the reflector 14b depends upon the relation in magnitude between the focal distance of the parabolic mirror 7 and size of the light-emission point.

[Construction of the Light Source for Improved Efficiency of Recycling (2)]

Figure 15:
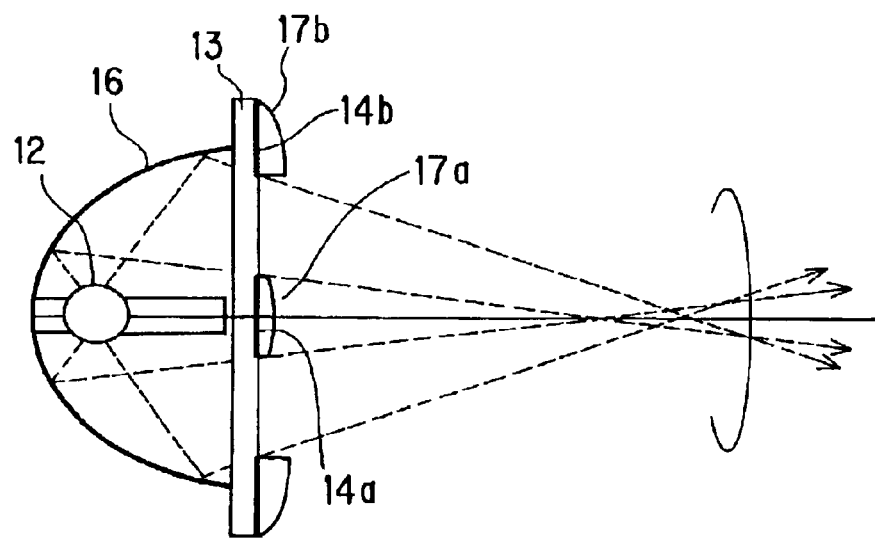
FIG. 15 is an axial-sectional view of a fifth embodiment of the light source included in the image display apparatus shown in FIG. 6.

Also in case the light source is composed of the lamp bulb 12, spheroidal mirror 16 which replaces the aforementioned parabolic mirror, and the protective glass 13, the reflectors 14a and 14b are formed on the protective glass 13 and in an ineffective zone where the primary light is not allowed to pass through, as shown in FIG. 15 which is an axial-sectional view of a fifth embodiment of the light source included in the image display apparatus according to the present invention. That is, the reflector 14a and 14b are formed at the center and along the periphery, respectively, of the protective glass 13.

Different from the parabolic mirror, however, it is not sufficient for improvement of the efficiency of light recycling to form the reflectors 14a and 14b solely on the spheroidal mirror 16. The reason is that since the light-emission point of the light source is positioned at the first focal point of the spheroidal mirror 16, so light (primary light) emitted from the light-emission point will be focused at the second focal point of the spheroidal mirror 16. Thus, to recycle the light effectively and efficiently, it is necessary to focus the light beam reflected by the reflectors at the second focal point of the spheroidal mirror 16. To this end, condenser lenses 17a and 17b are provided in close proximity to the reflectors 14a and 14b, respectively. The condenser lenses 17a and 17b are a circular lens and a toroidal lens, respectively, corresponding to the reflectors 14a and 14b, respectively. The circular lens is positioned at the center of the protective glass 13 while the toroidal lens is positioned along the periphery of the protective lens 13. Their focal points are coincident with the second focal point of the spheroidal mirror 16. The recycled light caused by the condenser lenses 17a and 17b to pass through the second focal point of the spheroidal mirror 16 becomes telecentric at the first reflecting element as having previously been described. Therefore, the recycled light reflected by the first reflecting element returns to the second focal point of the spheroidal mirror 16 and thereafter it becomes an effective light beam.

[Construction of the Light Source for Improved Efficiency of Recycling (3)]

Figure 16:
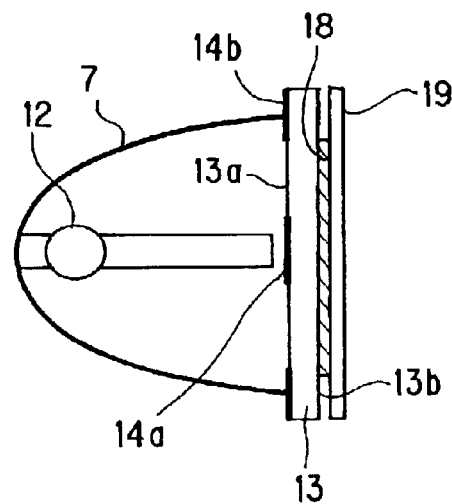
FIG. 16 is an axial-sectional view of a sixth embodiment of the light source included in the image display apparatus shown in FIG. 6.
Figure 17:
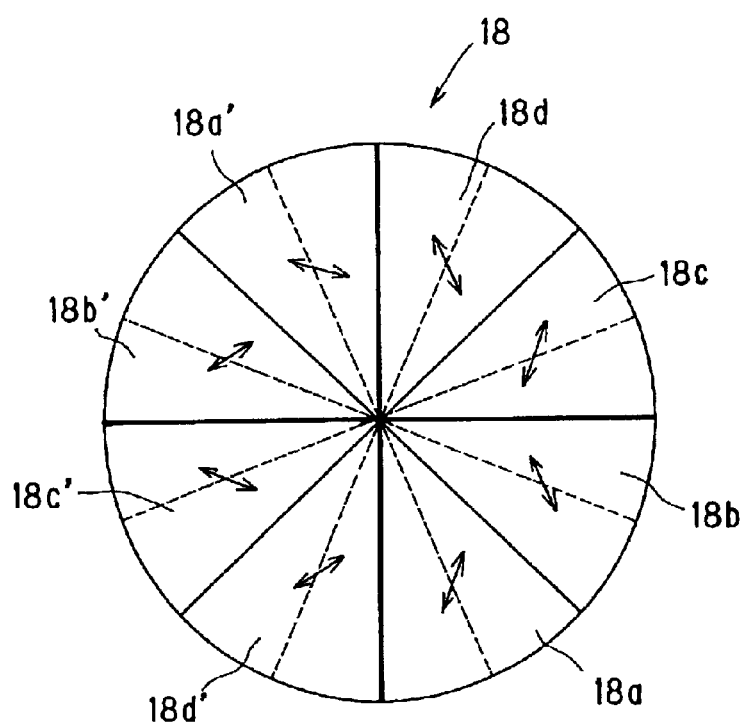
FIG. 17 is a front view of the quarter-wave ($\lambda/4$) plate included in the light source shown in FIG. 16.

Referring now to FIG. 16, there is schematically illustrated in the form of an axial-sectional view the sixth embodiment of the light source included in the image display apparatus according to the present invention. As shown, the light source may be composed of the lamp bulb 12 with the parabolic mirror 7, a quarter-wave ($\lambda/4$) plate 18, and a reflecting circular polarizer 19. As above, the phase change in the light reflection by the parabolic mirror 7 is not always 180 deg. but it will also vary depending upon the incident angle or wavelength. To accommodate this fact, the quarter-wave plate 18 and reflecting circular polarizer 19 are used in this light source to make a P- or S-polarization of the light in relation to the parabolic mirror 7. The quarter-wave plate 18 is divided into plural (an even number of) radial zones 18a, 18b, 18c, 18d, 18a', 18b', 18c' and 18d' symmetric with each other with respect to the center axis of the parabolic mirror 7 as shown in FIG. 17. The phase-retardation axis of each of these radial zones forms an angle of 45 deg. with a straight line connecting the center of each radial zone and the center axis of the parabolic mirror 7, and is perpendicular to the phase-retardation axis of the radial zones which are symmetric with respect to the center axis of the parabolic mirror 7. It should be noted that an ultraviolet- and infrared-cut filter (not shown) is provided between the quarter-wave plate 18 and protective glass 13 of the lamp bulb 12.

The reflecting circular polarizer 19 may be a one formed from a cholesteric liquid crystal polymer. The quarter-wave plate 18 should desirably be a one which works in a wide-band domain of wavelength. It should be noted that an anti-reflection coating is applied on the surface of contact with air.

The outgoing light from the lamp bulb 12 is linearly polarized by the quarter-wave plate 18 when it passes through the latter, and reaches the reflecting circular polarizer 19. At this time, the light will be P- or S-polarized in relation to the incident surface of the reflecting circular polarizer 19. Thus, the polarized light in one direction is reflected by the reflecting circular polarizer 19 towards the light source.

The reflected light from the reflecting circular polarizer 19 is passed through the quarter-wave plate 18, reflected twice by the parabolic mirror 7, and then reaches the quarter-wave plate 18 again. At this time, the light is incident upon a zone (18a', for example) of the quarter-wave plate 18, symmetric with a zone (18a, for example) of the same plate 18, through which the light has passed when reflected by the reflecting circular polarizer 19, with respect to the center axis of the parabolic mirror 7. Then, since the light has already passed through the quarter-wave plate 18 and reflecting circular polarizer 19, it is P- or S-polarized without incurring any phase difference. Therefore, passed through the zone of the quarter-wave plate 18, orthogonal to the phase-retardation axis, the light is circularly polarized in a direction opposite to that in which it has initially been incident upon the reflecting circular polarizer 19, and thus passes through the reflecting circular polarizer 19. In the light source, the polarized state is changed or converted in this way.

Note that in the light source shown in FIG. 16, the quarter-wave plate 18 and reflecting circular polarizer 19 are formed integrally with the protective glass 13 formed integrally with the parabolic mirror 7, but they may be formed separately from the protective glass 13.

However, the quarter-wave plate 18 should desirably be laid as close to the parabolic mirror 7 as possible. If it is laid apart from the parabolic mirror 7, a light beam having a large angle with the optic axis, having been reflected twice by the parabolic mirror 7 and reached the quarter-wave plate 18 again, will not be more likely to pass through the symmetric zones of the quarter-wave plate 18.

Also, the more the reflecting circular polarizer 19 is apart from the parabolic mirror 7, the reflected light from the reflecting circular polarizer 19 will be more likely to reach the reflector 14b at the periphery. In this case, the reflected light will not pass through the quarter-wave plate 18 but will be incident as a circularly polarized light upon the reflector 14b. When the light is reflected by the reflector 14b, its phase is changed by 180 deg. to provide an opposite-directional circularly polarized light which will pass through the reflecting circular polarizer 19. In this case, since the light is not reflected by the parabolic mirror 7 or influenced in any way by the lamp bulb 12, so the illumination light will possibly be recycled with an improved efficiency.

Note that similarly to the aforementioned combination of the quarter-wave plate and circular polarizer, a combination of a half-wave plate and a reflecting linear polarizer may provide a light source which can work similarly to the aforementioned light source.

[Construction of the Light Source for Improved Efficiency of Recycling (4)]

Figure 18:
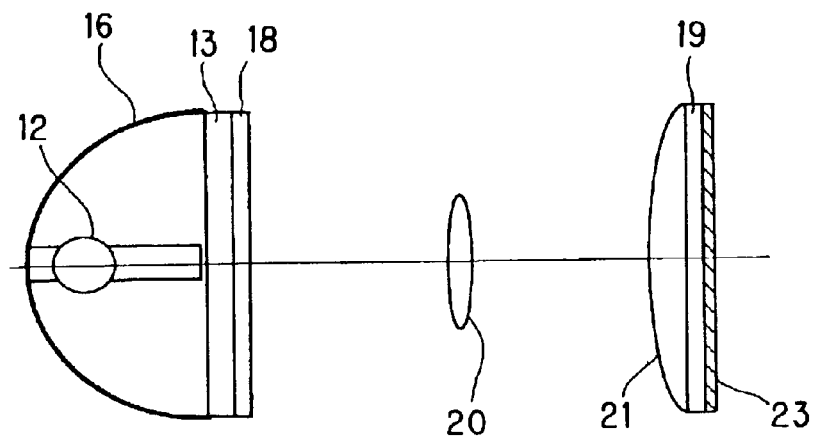
FIG. 18 is an axial-sectional view of a first embodiment of the illuminator included in the image display apparatus in FIG. 6.

Referring now to FIG. 18, there is schematically illustrated in the form of an axial-sectional view the first embodiment of the illuminator included in the image display apparatus according to the present invention. As shown, the light source may be composed of the lamp bulb 12 with the spheroidal mirror 16, quarter-wave plate 18, relay lens 20, field lens 21 and reflecting circular polarizer 19.

Figure 19:
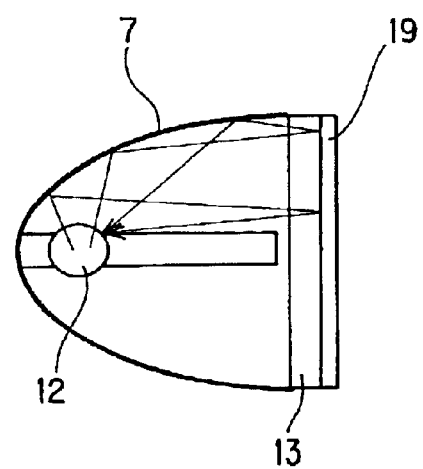
FIG. 19 is an axial-sectional view of the light source included in the image display apparatus in FIG. 6, in which a problem has arisen.
Figure 20:
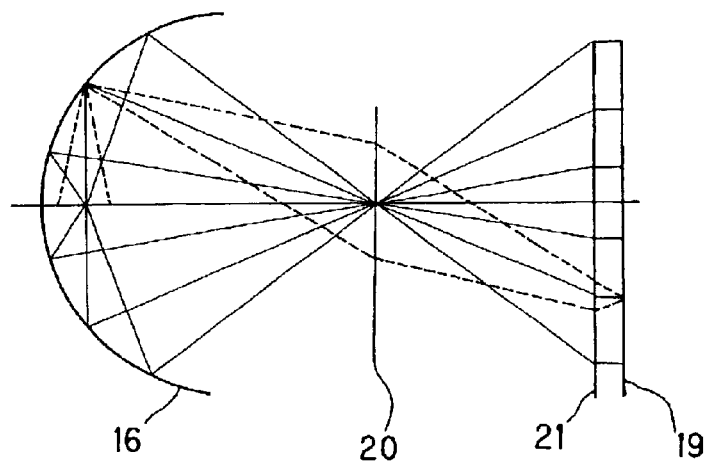
FIG. 20 is a side elevation of the first embodiment of the illuminator included in the image display apparatus in FIG. 6, showing the optical path in the illuminator.

In case of the light source with the parabolic mirror 7 as shown in FIG. 19, the light beam off the focal point of the parabolic mirror 7, reflected by the reflecting circular polarizer 19 and incident again upon the lamp bulb 12, will possibly be shaded by a shade such as the electrode of the lamp bulb 12. To avoid this possibility in the light source with the spheroidal mirror 16, the light-emission point of the lamp bulb 12 is located at the first focal point of the spheroidal mirror 16, the relay lens 20 is located at the second focal point of the spheroidal mirror 16, and the reflecting circular polarizer 19 is located nearly at a point of conjugation with the reflecting point on the spheroidal mirror 16 and relay lens 20, as shown in FIG. 20. The incident light upon the reflecting circular polarizer 19 is set telecentric by the field lens 21.

The light beam reflected by the reflecting circular polarizer 19 is reflected by the spheroidal mirror 16 back to the position at which the primary light has been reflected. The reflected light from the spheroidal mirror 16 returns to a position symmetric with the light-emission point with respect to the first focal point of the spheroidal mirror 16. Namely, the light beam is less shaded by the discharge electrode of the lamp bulb 12 or the like.

As in the aforementioned "Construction of the light source for improved efficiency of recycling (3)", the quarter-wave plate 18 is divided into plural radial zones different in direction of phase-retardation axis from each other as shown in FIG. 17, and it is laid in the vicinity of the protective glass 13 as shown in FIG. 18. Even when disposed between the reflecting circular polarizer 19 and field lens 21, the quarter-wave plate 18 will provide the same effect as above.

The quarter-wave plate 18 should desirably be a one which can work in a wide-band domain of wavelength. Also, an ultraviolet- and infrared-cut filter (not shown) is provided between the quarter-wave plate 18 and protective glass 13 of the lamp bulb 12.

Figure 21:
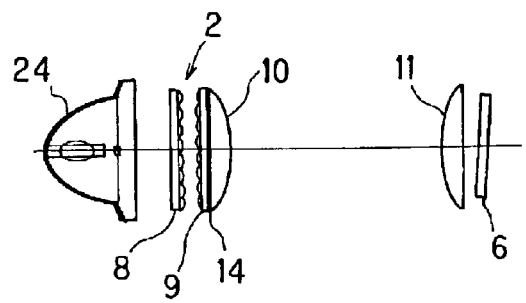
FIG. 21 is an axial-sectional view of a second embodiment of the illuminator included in the image display apparatus in FIG. 6, showing the optical path in the illuminator.

Referring now to FIG. 21, there is schematically illustrated in the form of an axial-sectional view the second embodiment of the illuminator included in the image display apparatus according to the present invention. As shown, the reflecting circular polarizer 19 may be a one made of a cholesteric liquid crystal polymer. It should be noted that an anti-reflection coating 23 is applied on the air-contact surface.

The outgoing light from the lamp bulb 12 is linearly polarized by the quarter-wave plate 18 when it passes through the latter, and is incident upon the reflecting circular polarizer 19. At this time, the light will be P- or S-polarized in relation to the incident surface of the reflecting circular polarizer 19. Thus, the polarized light in one direction is reflected by the reflecting circular polarizer 19 towards the light source.

The reflected light from the reflecting circular polarizer 19 is passed through the quarter-wave plate 18, reflected twice by the spheroidal mirror 16, and then incident again upon the quarter-wave plate 18. At this time, the light is incident upon a zone (18a', for example) of the quarter-wave plate 18 symmetric with a zone (18a, for example) of the same plate 18, through which the light has passed when reflected by the reflecting circular polarizer 19, with respect to the center axis of the parabolic mirror 7. Then, since the light has already passed through the quarter-wave plate 18 and reflecting circular polarizer 19, it is P- or S-polarized without incurring any phase difference. Therefore, passing through the zone of the quarter-wave plate 18, orthogonal to the phase-retardation axis, the light is circularly polarized in a direction opposite to that in which it has initially been incident upon the reflecting circular polarizer 19, and passes through the latter. Thus, the polarized state is converted in the light source.

Note that similarly to the aforementioned combination of the quarter-wave plate and circular polarizer, a combination of a half-wave plate and a reflecting linear polarizer may provide a light source which can work similarly to the aforementioned light source.

[Construction of the Illuminator for Improved Efficiency of Recycling (1)]

Figure 22:
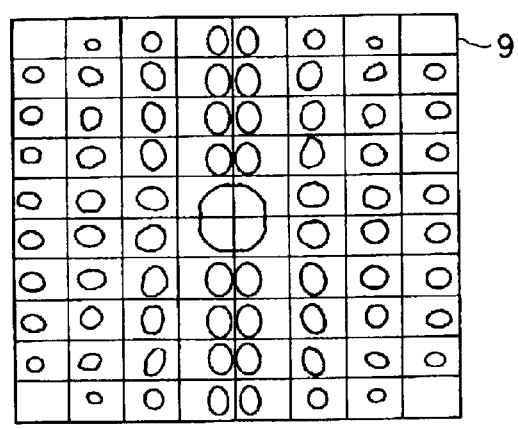
FIG. 22 is a front view of the reflecting element in the second embodiment of the illuminator included in the image display apparatus in FIG. 6.

As shown in FIG. 21, the illuminator used in the image display apparatus according to the present invention includes the light source 24 constructed as having been illustrated and described in the foregoing, fly-eye integrator 2, condenser lens 10, field lens 11, and first reflecting element 6. In this illuminator, each of the segments of the fly-eye lens 9 of the fly-eye integrator 2 is a diaphragm for each of segments of the corresponding fly-eye lens 8. Namely, the light beams passing through the segments of the corresponding second fly-eye lens 9 are all focused on an object to be illuminated. Actually, however, not the entire diaphragm is utilized but the diaphragm has ineffective zones where the illumination is low as shown in FIG. 22. In this illuminator, such ineffective zones on the second fly-eye lens 9 are utilized effectively.

More specifically, the above illuminator has the reflector 14 provided, as a second reflecting element, between the second fly-eye lens 9 of the fly-eye integrator 2 and the condenser lens 10. It should be noted that in case the P-S converter exists as above, the reflector 14 is provided between the second fly-eye lens 9 of the fly-eye integrator 2 and the P-S converter.

The reflector 14 is disposed where it will not shade the primary light from the light source. More particularly, the reflector 14 is formed to have an aperture pattern whose configuration corresponds to the light intensity distribution on the second fly-eye lens 9 of the fly-eye integrator 2 shown in FIG. 22 or to have a stripe structure.

In this illuminator, the recycled light reflected by the first reflecting element 6 can be returned again to the to-be-illuminated object by returning it to any zone other than the aperture of the reflector 14, and it can thus be utilized efficiently.

Since the reflector 14 is laid at the side, nearer to the light-source, of the condenser lens 10, the condenser lens 10 and field lens 11 will form together a relay-condenser illumination optical system for the recycled light. The condenser lens 10 works as a relay lens. Also, the optical system is a telecentric one for the first reflecting element 6 and reflector 14. Namely, the central ray of the light beam is parallel to the optic axis of the optical system.

In case the recycled light reflected by the reflector 14 has been reflected again by the first reflecting element 6, it retraces the optical path along which the primary light has traveled and returns to the light source 24. With this process repeatedly done, the illumination light is recycled.

Figure 23:
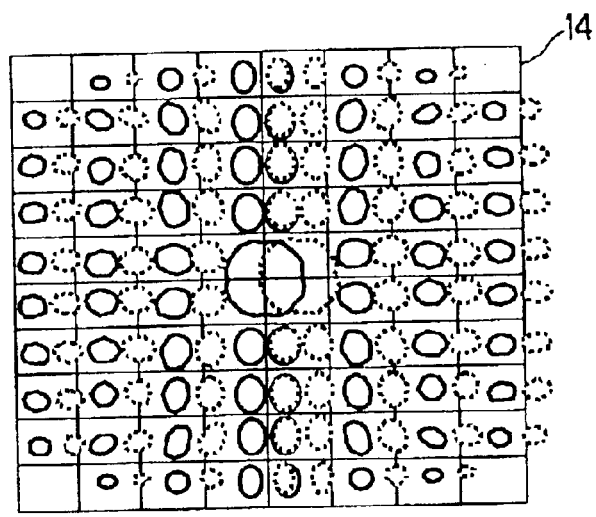
FIG. 23 is a front view of the reflecting element in the second embodiment of the illuminator included in the image display apparatus in FIG. 6, in which the reflecting element is provided obliquely in the lateral direction in the illuminator, showing when the recycling light has returned to the reflector
Figure 24:
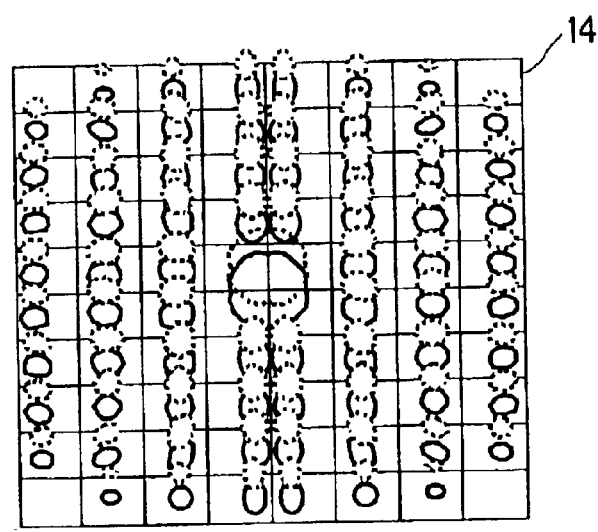
FIG. 24 is a front view of the second embodiment of the illuminator included in the image display apparatus in FIG. 6, in which the reflecting element is laid obliquely in the longitudinal direction, showing when the recycling light has returned to the reflector.

The first reflecting element 6 is laid obliquely in relation to the optic axis. The first reflecting element 6 is horizontally or vertically oblique in relation to the optic axis. When the first reflecting element 6 is horizontally oblique, the light intensity distribution of the recycled light on the second fly-eye lens 9 of the fly-eye integrator 2 is such that bright zones appear shifted laterally from the aperture pattern of the reflector 14 as indicated with dashed lines in FIG. 23. When the first reflecting element 6 is vertically oblique, the light intensity distribution of the recycled light on the second fly-eye lens 9 of the fly-eye integrator 2 is such that the bright zones appear shifted longitudinally from the aperture pattern of the reflector 14 as indicated with dashed lines in FIG. 24.

A part of the light thus returning to the reflector 14 will be outside the profile of the second fly-eye lens 9 of the fly-eye integrator 2. However, the light returning to the reflector 14 can be wholly collected with the use of the condenser lens 10 having a larger outside diameter. Also, since a part of the light returning to the reflector 14, overlapping the aperture pattern indicated with solid lines in FIGS. 18 and 19, returns to the light source 24 through the aperture pattern, it will not be lost but will be reused as the illumination light.

Also, the first reflecting element 6 may not be laid obliquely relative to the optic axis but may be shifted along with the condenser lens 11 a predetermined distance in parallel to the optic axis,. It should be noted that the predetermined distance of shifting of the optical system laid downstream of the condenser lens 11 in relation to the optic axis is about a quarter of the pitch between the fly-eye lens segments.

Note that the surface of the reflector 14 should desirably be superior in flatness for an Improved Efficiency of Recycling the illumination light. However, the recycled light reflected by the first reflecting element 6, having a pattern which will be defined by inverting the aperture pattern of the reflector 14, returns to the reflector 14. Therefore, for a uniform illumination by the recycled light, the reflector 14 may have an appropriate light-scattering surface.

Figure 25:
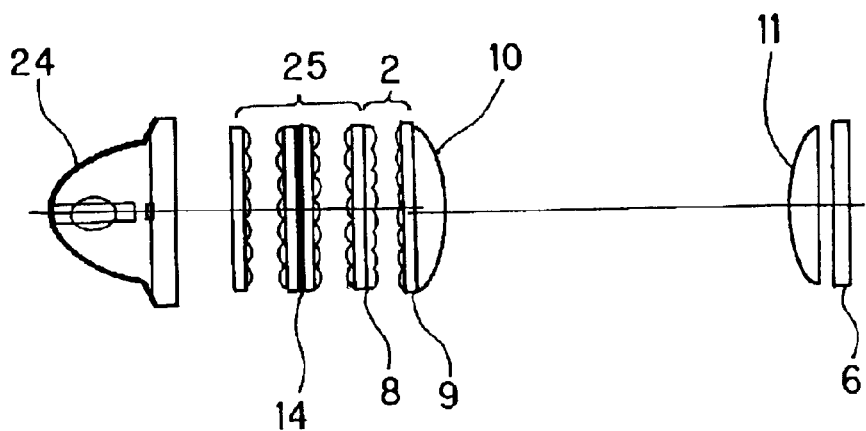
FIG. 25 is an axial-sectional view of a third embodiment of the illuminator included in the image display apparatus in FIG. 6.

Further, the illuminator may include two fly-eye integrators 2 and 25 as shown in FIG. 25. In this case, the recycled light can have an improved uniformity of illumination.

More particularly, the first fly-eye integrator 2 consists of segments generally similar to the object to be illuminated. The second fly-eye integrator 25 laid between the first fly-eye integrator 2 and light source 24 may be different in shape from the first fly-eye integrator 2.

The second fly-eye integrator 25 forms the relay-condenser illumination optical system in which the reflector 14 as the second reflecting element is located in a zone near the diaphragm and where it will not shade the primary light.

Also, the optic axis of the optical system laid downstream of the condenser lens 10 (condenser lens 10 and first reflecting element 6) is shifted about a quarter of the pitch between the segments of the first fly-eye integrator 2 in relation to the optic axis of the other optical system. The first and second fly-eye integrators 2 and 25 are set different in segment pitch from each other.

In this illuminator, the recycled light reflected by the first reflecting element 6 forms a reflected-light pattern on each of the segments of the first fly-eye lens 8 of the first fly-eye integrator 2. Since the second fly-eye integrator 25 is different in segment pitch from the first fly-eye integrator 2, the recycled light incident upon the reflector 14 is reflected by the latter. When the reflected recycled light is incident again upon the first fly-eye lens 8 of the first fly-eye integrator 2, it forms a pattern different from that which has initially been formed when it returns to the first fly-eye lens 8. Therefore, the recycled light passes through the first fly-eye integrator 2, and it incident upon the first reflecting element 6. At this time, the recycled light will have the illumination thereof uniformed.

[Construction of the Illuminator for Improved Efficiency of Recycling (2)]

Figure 26:
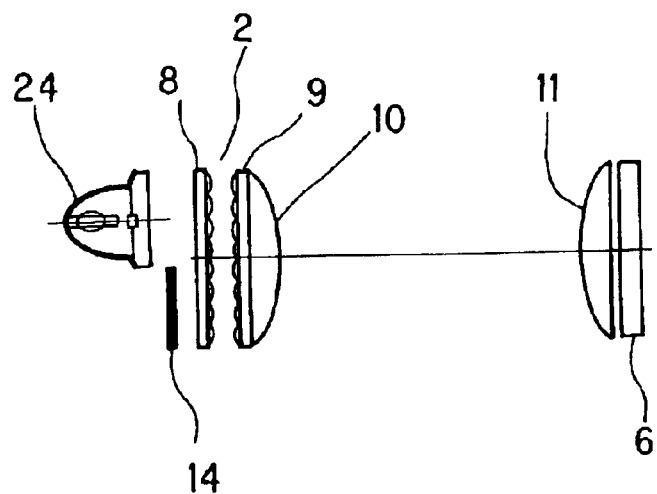
FIG. 26 is an axial-sectional view of a fourth embodiment of the illuminator included in the image display apparatus in FIG. 6.

Referring now to FIG. 26, there is schematically illustrated in the form of an axial-sectional view the fourth embodiment of the illuminator included in the image display apparatus according to the present invention. As shown, the illuminator may be constructed with the optic axis of the optical system (condenser lens 10, field lens 11 and first reflecting element 6) laid downstream of the condenser lens 10 being shifted in parallel to that of the light source 24. The fly-eye integrator 2 is laid between the light source 24 and condenser lens 10 in a zone where it will work with both the light source 24 and the optical system laid downstream of the condenser lens 10. The reflector 14 is disposed in a position at the side, nearer to the light source 24, of the fly-eye integrator 2, symmetric with the light source 24 with respect to the optic axis of the optical system laid downstream of the condenser lens 10.

In the above illuminator, a part of the primary light having reached the first reflecting element 6 from the light source 24 is incident, as a recycled light, upon the reflector 14 disposed at the side, nearer to the light source 24, of the fly-eye integrator 2, and uniformed by the fly-eye integrator 2 to illuminate the to-be-illuminated object with a high efficiency.

In case the recycled light reflected by the reflector 14 has been reflected again by the first reflecting element 6, it retraces the optical path along with the primary light has traveled to return to the light source 24. With this process repeated, the illumination light is recycled.

[Construction of the Illuminator for Improved Efficiency of Recycling (3)]

Figure 27:
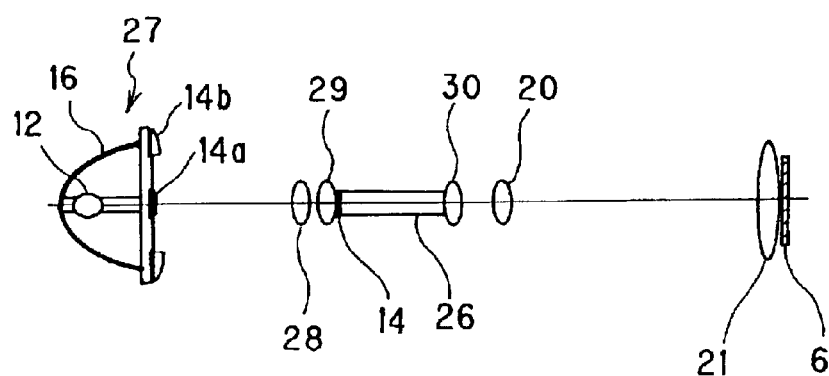
FIG. 27 is an axial-sectional view of a fifth embodiment of the illuminator included in the image display apparatus in FIG. 6.

Referring now to FIG. 27, there is schematically illustrated in the form of an axial-sectional view the fifth embodiment of the illuminator included in the image display apparatus according to the present invention. As shown, the illuminator may include a rod integrator 26. The rod integrator 26 is a prismatic optical device made of a transparent material. The light beam is incident upon one end of the rod integrator 26 and goes out from the other end. This illuminator is constructed out of a light source 27 with the spheroidal mirror 16, rod integrator 26, and a relay-condenser optical system laid between the light source 27 and rod integrator 26. The relay-condenser optical system includes a condenser lens 28 and relay lens 29. The condenser lens 28 is located at the second focal point of the spheroidal mirror 16, and the relay lens 29 is at the focal point of the condenser lens 28.

Figures 28A, 28B:
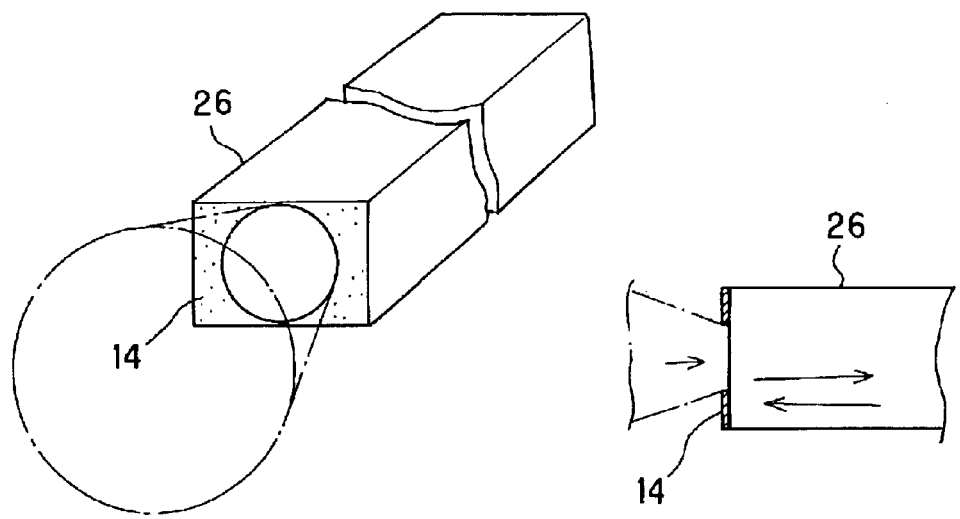
FIG. 28A is a perspective view.
FIG. 28B is a plan view, of the rod integrator and reflector in the fifth embodiment of the illuminator included in the image display apparatus in FIG. 6.

The reflector 14 having an aperture formed therein is provided near one end of the rod integrator 26, upon which the light beam from a light source 27 is incident. The reflector 14 may be formed on the end face, nearer to the light source 27, of the rod integrator 26, for example, as shown in FIGS. 28A and 28B.

Further, a relay lens system (30, 20), field lens 21 and first reflecting element 6 are provided at the light-incident end of the rod integrator 26.

When the recycled light reflected by the first reflecting element 6 returns to the light-incident end of the rod integrator 26, its illumination has been uniformed by the rod integrator 26. Thus, the recycled light having returned to a part, other than the aperture, of the reflector 14 is reflected by the reflector 14. Similarly to the primary light, the reflected light beam from the reflector 14 is uniformed by the rod integrator 26 to illuminate the to-be-illuminated object with a high efficiency. The recycled light passed through the aperture will return to the light source 27. With this processed repeatedly done, the illumination light is recycled.

Note that the above light source may be a one with a parabolic mirror.

[Construction of the Illuminator for Improved Efficiency of Recycling (4)]

Figure 29:
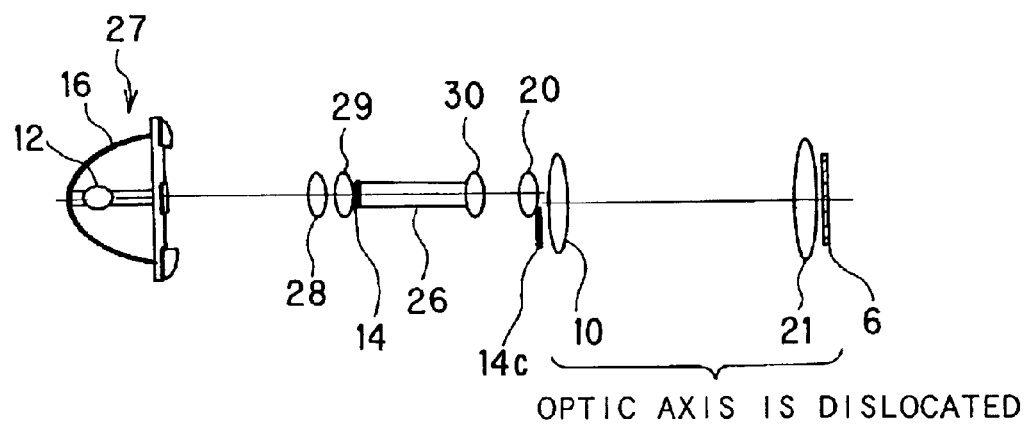
FIG. 29 is an axial-sectional view of a sixth embodiment of the illuminator included in the image display apparatus in FIG. 6.

Referring now to FIG. 29, there is schematically illustrated in the form of an axial-sectional view the sixth embodiment of the illuminator included in the image display apparatus according to the present invention. As shown, the illuminator may be formed with the optic axis of a part of the optical system laid shifted in parallel to that of the rest of the optical system. The illuminator further includes the condenser lens 10 provided between the relay lens 20 and field lens 21 in the illuminator having been illustrated and described with reference to FIG. 27, and is formed with the optic axis of the optical system laid downstream of the condenser lens 10 being shifted in parallel to that of the optical system ranging from the light source 27 to the relay lens 20. Further, at the side, nearer to the light source, of the condenser lens 10, there is provided a reflector 14c in a position symmetric with the optic axis of the optical system laid down to the relay lens 20 with respect to the optic axis of the optical system laid downstream of the condenser lens 10.

In the above illuminator, the recycled light reflected by the first reflecting element 6 is incident upon the reflector 14c, reflected by the latter, passes through the condenser lens 10 and field lens 21, and is incident again upon the first reflecting element 6. When the recycled light reflected again by the first reflecting element 6 returns to the rod integrator 26, its illumination has been uniformed by the rod integrator 26. Thus, the recycled light having returned to the part, other than the aperture, of the reflector 14 is reflected by the latter. The light beam reflected by the reflector 14 is uniformed by the rod integrator 26 to illuminate the to-be-illuminated object with a high efficiency. The recycled light passed through the aperture returns to the light source 27. With this process repeatedly done, the illumination light is recycled.

[Construction of the Image Display Apparatus with the Function of Polarized Component Conversion (1)]

Figure 30A:
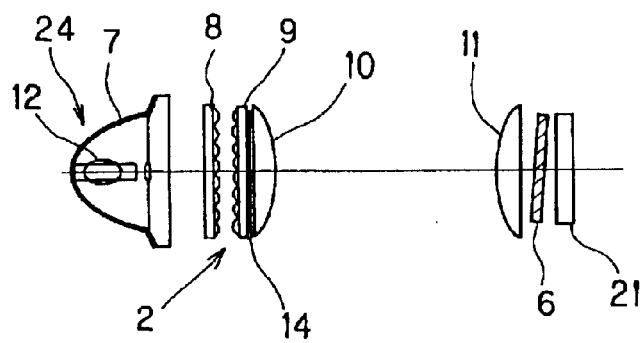
FIG. 30A is an axial-sectional view of the first embodiment of the illuminator.

Referring now to FIG. 30A, there is schematically illustrated in the form of an axial-sectional view the first embodiment of the image display apparatus according to the present invention. As shown, the image display apparatus according to the present invention includes the aforementioned light source 24. The light source 24 includes the lamp bulb 12 and parabolic mirror 7. Also, the image display apparatus includes the first reflecting element 6 as a reflecting polarizer. Thus, it has a function as a polarized-state converter.

More specifically, the image display apparatus includes the light source 24, fly-eye integrator 2, reflector 14, condenser lens 10, field lens 21, reflecting polarizer 6 and a modulator 31, disposed in this order at predetermined intervals. The reflecting polarizer 6 is laid obliquely in relation to the optic axis. The angulation of the reflecting polarizer 6 is such that as mentioned above, when the recycled light reflected by the reflecting polarizer 6 returns to the reflector 14, it will be incident mainly upon an ineffective part of the reflector 14, off the aperture patten of the latter.

The reflecting polarizer 6 may be made of a cholesteric liquid crystal polymer. Also, by forming an anti-reflection coating on the air-contact surface of a substrate on which the cholesteric liquid crystal polymer layer is formed, it is possible to improve the polarized component splitting as shown in FIG. 31. In FIG. 31, it is presumed that the range of selective reflection by the cholesteric liquid crystal polymer layer is set within a range of 420 to 690 nm. FIG. 31A shows the spectral transmittance of left-hand circularly polarized light when the anti-reflection coating is formed on the reflecting circular polarizer, FIG. 31B shows the spectral transmittance of right-hand circularly polarized light when the anti-reflection coating is formed on the reflecting circular polarizer, FIG. 31C shows the spectral transmittance of left-hand circularly polarized light when the anti-reflection coating is not formed on the reflecting circular polarizer, and FIG. 31D shows the spectral transmittance of right-hand circularly polarized light when the anti-reflection coating is not formed on the reflecting circular polarizer.

Figure 30B:
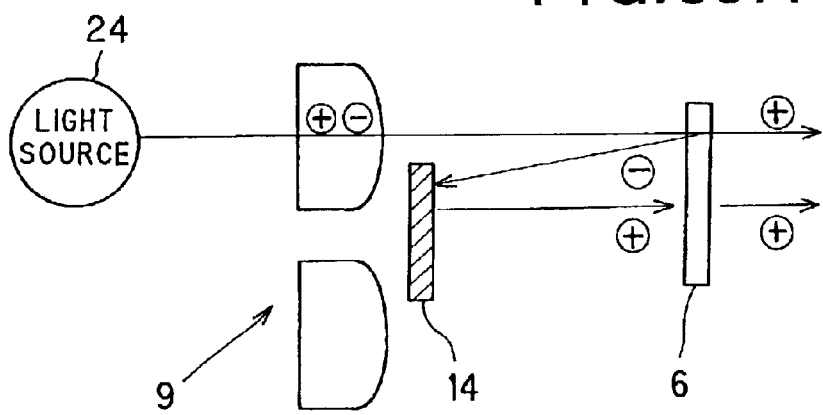
FIG. 30B shows the theory of illumination of the illuminator in FIG. 30A.

The illumination light emitted from the light source 24 is passed through the fly-eye integrator 2, aperture pattern of the reflector 14, condenser lens 10 and field lens 11 to the reflecting polarizer 6. One circularly polarized light passes through the reflecting polarizer 6 while the other is reflected by the polarizer 6 as shown in FIG. 30B. The reflected circularly polarized light returns to the reflector 14, and is reflected by the latter to be an oppotiste-directional circularly polarized light. This light is incident again upon the reflecting polarizer 6 and passes through the latter. The light thus passed through the reflecting polarizer 6 is incident upon the modulator 31 where it will undergo spatial modulation according to an image to be displayed.

Note that when linearly polarized light has to be incident upon the modulator 31, a quarter-wave plate should be provided between the reflecting polarizer 6 and modulator 31. Also, by additionally providing an absorbing polarizer, it is possible to shade unwanted polarized light.

Also, the reflecting polarizer may be a reflecting linear polarizer. In this case, the quarter-wave plate is provided on the reflector 14 or at the side, nearer to the light source, of the reflecting linear polarizer.

[Construction of the Image Display Apparatus with the Function of Polarized-State Conversion (2)]

Figure 32:
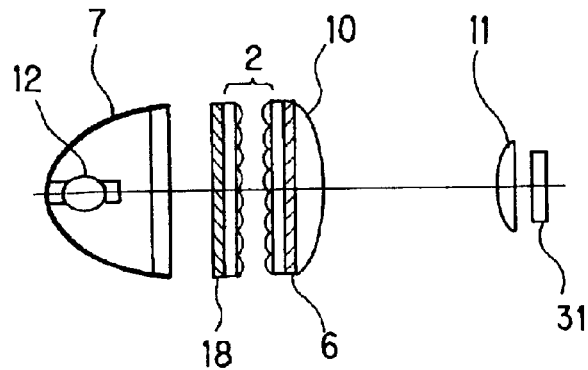
FIG. 32 is an axial-sectional view of the second embodiment of the illuminator included in the image display apparatus in FIG. 6.

Referring now to FIG. 32, there is schematically illustrated in the form of an axial-sectional view the second embodiment of the image display apparatus according to the present invention. As shown, the image display apparatus may be composed of the light source 24 including the lamp bulb 12 and parabolic mirror 7, quarter-wave plate 18, fly-eye integrator 2, reflecting polarizer 6, condenser lens 10, field lens 11 and modulator 31 provided in this order at predetermined intervals.

In the above image display apparatus, the reflecting polarizer 6 may be made of a cholesteric liquid crystal polymer-made circular polarizer. Also, the quarter-wave plate 18 is divided into plural (an even number of) radial zones $18a$, $18b$, $18c$, $18d$, $18a'$, $18b'$, $18c'$ and $18d'$ symmetric with each other with respect to the center axis of the parabolic mirror 7 as shown in FIG. 17. The phase-retardation axis of each of these radial zones forms an angle of 45 deg. with a straight line connecting the center of each radial zone and the center axis of the parabolic mirror 7, and is perpendicular to the phase-retardation axis of the radial zones which are symmetric with each other with respect to the center axis of the parabolic mirror 7.

The light emitted from the light source 24 is passed through the quarter-wave plate 18 to the reflecting polarizer 6. At the reflecting polarizer 6, one circularly polarized component of the light is allowed to pass through while the other circularly polarized component is reflected towards the light source 24. Since the second fly-eye lens of the fly-eye integrator 2 is conjugate with the light emitter (lamp bulb 12) of the light source 24, so the reflected light from the reflecting polarizer 6 returns to the light emitter (lamp bulb 12). Thus, the light returning towards the light source 24 is converted to a linearly polarized light when passing through the quarter-wave plate 18, and then incident upon the parabolic mirror 7.

The phase-retardation axis of the quarter-wave plate 18 is directed at an angle of 45 deg. with a straight line connecting the center of each area and the center axis of the parabolic mirror 7, that is, the incident surface of the parabolic mirror 7. Thus, the linearly polarized light after returning from the reflecting polarizer 6 and passing through the quarter-wave plate 18 is P- or S-polarized in relation to the incident surface of the parabolic mirror 7. The light is reflected twice by the parabolic mirror 7 without incurring any phase change, and passes through the quarter-wave plate 18 again.

The light having passed three times through the quarter-wave plate 18 as above will be circularly polarized in a direction in which it will pass through the reflecting polarizer 6. Thus, the reflected light from the reflecting polarizer 6 is recycled, and thus the light changed in polarized state after passing through the reflecting polarizer 6 can be utilized with an improved efficiency.

[Construction of the Image Display Apparatus with the Function of Polarized-state Conversion (3)]

Figure 33A:
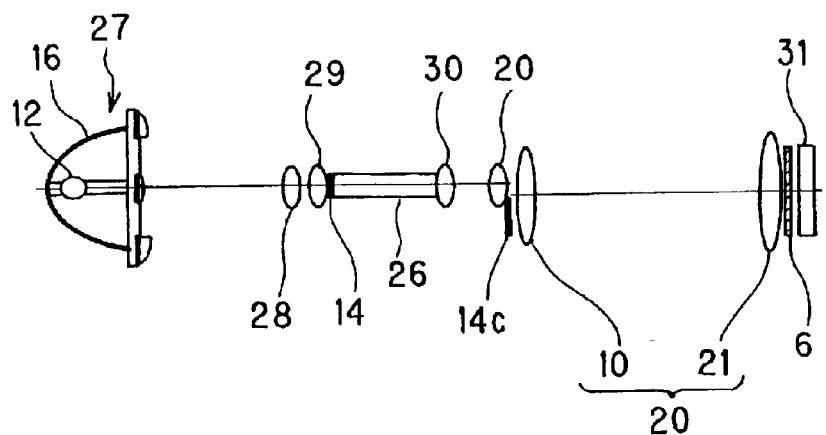
FIG. 33A is an axial-sectional view of the third embodiment of the illuminator included in the image display apparatus in FIG. 6.

Referring now to FIG. 33A, there is schematically illustrated in the form of an axial-sectional view the third embodiment of the image display apparatus according to the present invention. As shown, the image display apparatus is constructed out of an illuminator composed of the light source 27 with the spheroidal mirror 16, relay lens 28, field lens 29, reflector 14 having an aperture, rod integrator 26, condenser lens 30, relay lens 20, reflector 14c, condenser lens 10, field lens 21 and the reflecting polarizer 6, and also the modulator 31 provided in addition to the illuminator. The optic axis of the optical system laid downstream of the condenser lens 10 is shifted in parallel to that of the optical system ranging from the light source 27 to the relay lens 20. In this image display apparatus, the light source 27 and reflecting polarizer 6 provide the function of polarized-state conversion. As in the aforementioned embodiment, the reflecting polarizer 6 is made of a cholesteric liquid crystal polymer-made circular polarizer.

Figure 33B:
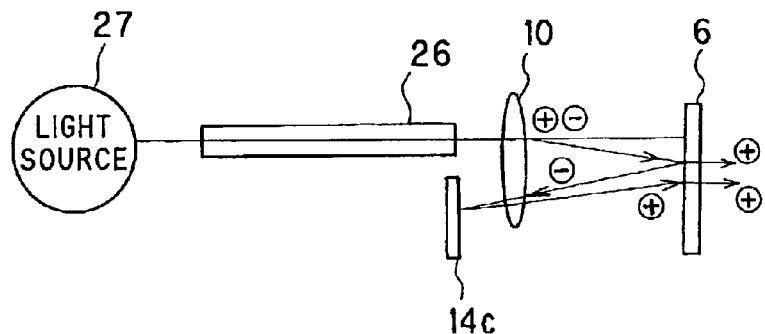
FIG. 33B shows the theory of illumination of the illuminator in FIG. 33A.

The illumination light emitted from the light source 27 is passed through the relay lens 28, field lens 29, rod integrator 26, condenser lens 30, relay lens 20, condenser lens 10 and field lens 21 to the reflecting polarizer 6 which allows one circularly polarized component to pass through it while reflecting the other circularly polarized component, as shown in FIG. 33B. The reflected polarized light is incident upon the reflector 14c. The light is reflected by the reflector 14c to be an opposite-directional circularly polarized light. This light is incident again upon the reflecting polarizer 6 and passes through the latter. The light thus passed through the reflecting polarizer 6 is incident upon the modulator 31 in which it will undergo spatial modulation according to an image to be displayed.

Note that when a linearly polarized light has to be incident upon the modulator 31, a quarter-wave plate should be provided between the reflecting polarizer 6 and modulator 31. Also, by additionally providing an absorbing polarizer, it is possible to cut off unwanted polarized light.

Also, the reflecting polarizer may be a reflecting linear polarizer. In this case, the quarter-wave plate is provided on the reflector 14 or at the side, nearer to the light source, of the reflecting linear polarizer.

[Construction of the Image Display Apparatus with the Function of Polarized-state Conversion (4)]

Figure 34A:
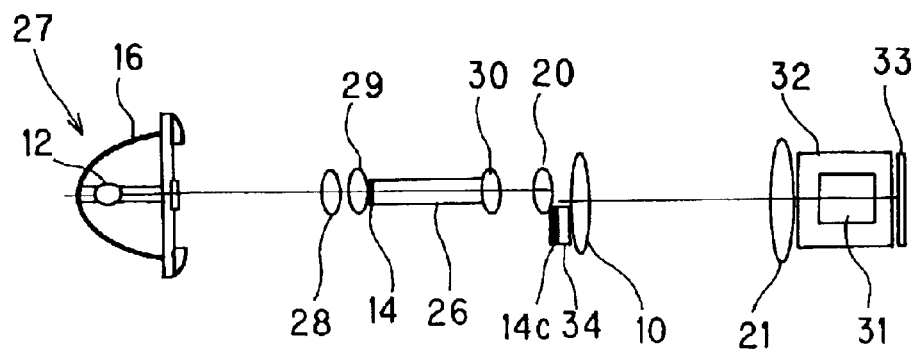
FIG. 34A is an axial-sectional view of the fourth embodiment of the illuminator includes in the image display apparatus in FIG. 6, and FIGS. 34B and 34C show the theory of the illuminator in FIG. 34A.
Figure 35A:
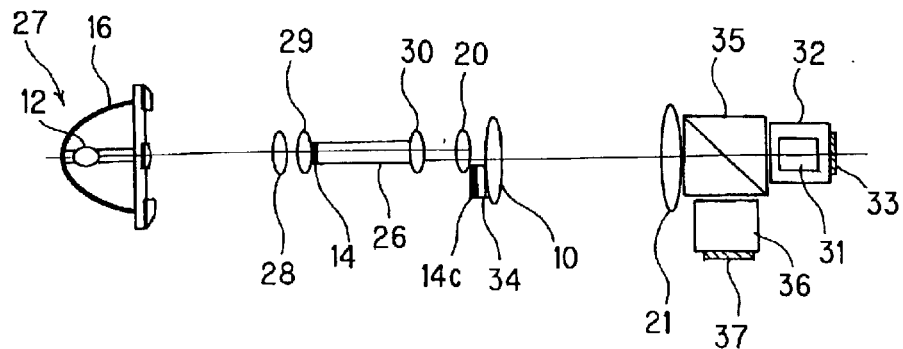
FIG. 35A is an axial-sectional view of the fifth embodiment of the illuminator included in the image display apparatus in FIG. 6.
Figure 36:
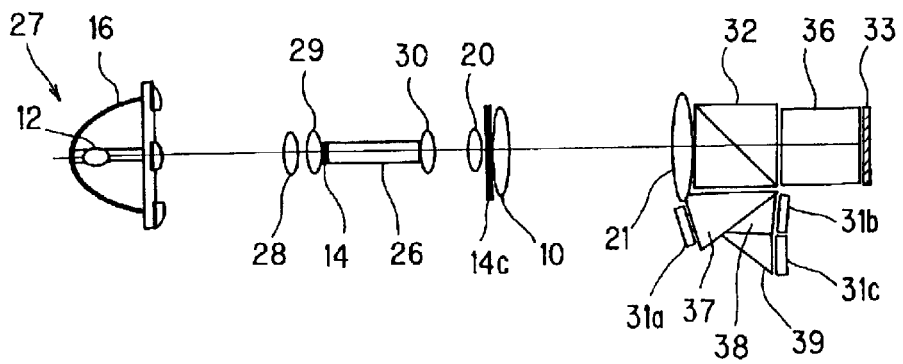
FIG. 36 is an axial-sectional view of the sixth embodiment of the illuminator included in the image display apparatus in FIG. 6.

Referring now to FIG. 34A, FIGS. 35A and 36, there are schematically illustrated in the form of an axial-sectional view the fourth, fifth and sixth embodiments of the image display apparatus according to the present invention. As shown, each of the embodiments of the image display apparatus includes the light source 27 with the spheroidal mirror 16, relay lens 28, field lens 29, reflector 14 having an aperture, rod integrator 26, condenser lens 30, relay lens 20, reflector 14c, condenser lens 10 and the field lens 21, and also the modulator 31 provided at the lateral side of the polarization beam splitter 32. The optic axis of the optical system laid downstream of the condenser lens 10 is shifted in parallel to that of the optical system ranging from the light source 27 to the relay lens 20. Also, a quarter-wave plate 34 is provided between the condenser lens 10 and reflector 14c. In this image display apparatus, the polarization beam splitter 32 provides the function of polarized-state conversion.

More specifically, as shown in FIG. 34A, a reflector 33 is provided downstream of the polarization beam splitter 32 as viewed from the field lens 21 and the modulator 31 is provided at the lateral side of the polarization beam splitter 32 as above. The reflector 33 and modulator 31 are located to have an equal optical path length from the field lens 21, namely, from the inner reflecting plane of the polarization beam splitter 32.

Figure 34B:
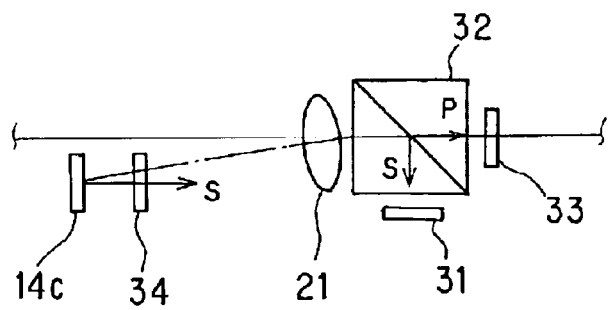

In the above image display apparatus, the outgoing light from the light source 27 is passed through the illumination optical system to the polarization beam splitter 32. The illumination light is split by the polarization beam splitter 32 into S- and P-polarized light beams. As shown in FIG. 34B, the S-polarized light is reflected at the reflecting plane of the polarization beam splitter 32 and incident upon the modulator 31, while the P-polarized light is passed through the reflecting plane of the polarization beam splitter 32 and incident upon the reflector 33 by which it will be reflected. The recycled light reflected by the reflector 33 retraces the optical path, passes through a quarter-wave plate 34, is reflected by the reflector 14c, and passes through the quarter-wave plate 34 again. The light is S-polarized by the quarter-wave plate 34 and incident again upon the polarization beam splitter 32. At this time, since the recycled light is S-polarized in relation to the reflecting plane of the polarization beam splitter 32, it is reflected at the reflecting plane to illuminate the modulator 31 to illuminate the modulator 31.

Figure 34C:
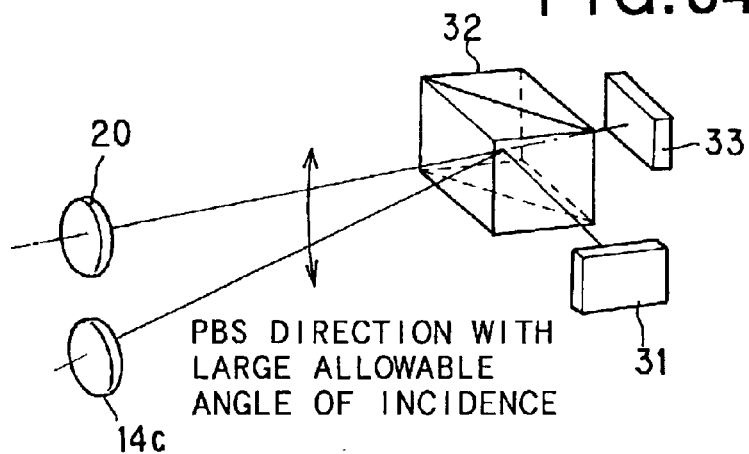

Note that the optic axis of the optical system laid downstream of the condenser lens 10 should desirably be shifted in a direction in which the distance between the field lens 21 and polarization beam splitter 32 will not change as the optic axis is shifted, as shown in FIG. 34C, in order to allow the angle of incidence of the light beam to increase correspondingly to an optic axis movement. Also, owing to this construction, the peak brightness which will be described in detail later can be effectively improved.

Figure 35B:
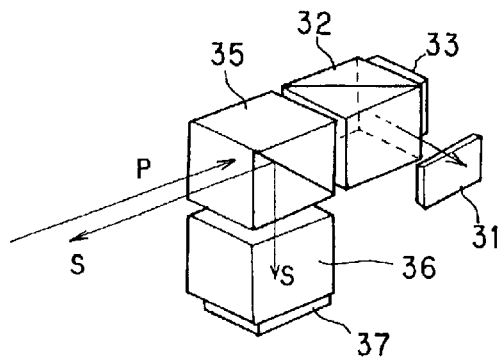
FIG. 35B shows the theory of illumination of the illuminator in FIG. 35A.

In case an intended optical extinction ratio cannot be attained by a single beam splitter, an auxiliary polarization beam splitter may be additionally provided as shown in FIGS. 35A and 35B. That is, in the above image display apparatus, the reflector 33 is located following two polarization beam splitters 35 and 32 laid downstream of the field lens 21, and the modulator 31 is located at the lateral side of the second polarization beam splitter 32. Also, an optical path length adjusting block 36 is provided at the lateral side of the first polarization beam splitter 35 and a reflector 37 is provided at the lateral side of the optical path length adjusting block 35. These reflector 33, modulator 31 and reflector 37 are located to have an equal optical path length from the field lens 21, namely, from the inner reflecting planes of the polarization beam splitters 32 and 35, respectively. The two polarization beam splitters 35 and 32 are in such a geometric relation that the light beams are reflected by the planes of reflection in orthogonal directions.

In this image display apparatus, the recycled light can be returned to the modulator 31 as in the image display apparatus having been illustrated and described with reference to FIG. 34A, and the two tandem polarization beam splitters can attain a larger optical extinction ratio.

Further, in case three modulators for three primary colors: red (R), green (G) and blue (B), respectively, the reflector 33 is located following the polarization beam splitter 32 and optical path length adjusting block 36 laid downstream of the field lens 21, and modulators 31a, 31b and 31c are provided at the lateral side of the polarization beam splitter 32 as well as in pair with color separation prisms 37, 38 and 39, respectively, as shown in FIG. 36. The reflector 33 and modulators 31a, 31b and 31c are located to have an equal optical path length from the field lens 21, namely, from the inner reflecting plane of the polarization beam splitter 32, through the color separation prisms 37, 38 and 39.

In the above image display apparatus, the illumination light is separated by the color separation prims 37, 38 and 39 into the three primary colors (R, G and B), the modulators 31a, 31b and 31c modulate the separated colors according to R (red), G (green) and B (blue), respectively, of an image to be displayed, and the light beams passed through these modulators 31a, 31b and 31c are recombined to display the image.

Note that since the optic axis of the optical system laid downstream of the condenser lens 10 is shifted in a direction perpendicular to the plane of the drawing (FIG. 36), so the optic-axis shifting is not shown in FIG. 36 but the optical system ranging from the light source 27 to the field lens 21 is similar in construction to those in FIGS. 34A and 35A.

[Construction of the Image Display Apparatus with the Reflective Color Filter]

Figure 37A:
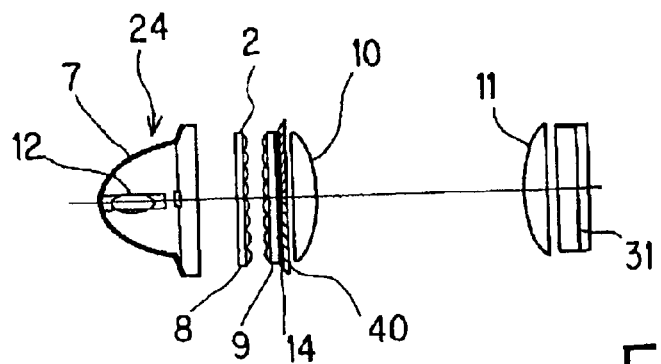
FIG. 37A is an axial-sectional view of a seventh embodiment of the illuminator included in the image display apparatus in FIG. 6.
Figure 37B:
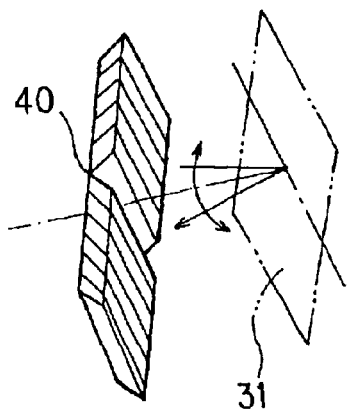
Figure 38:
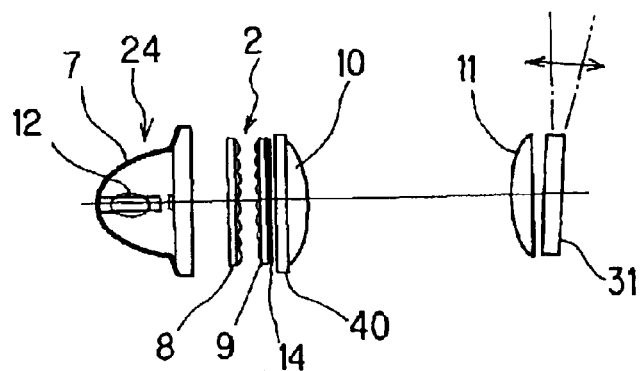
FIG. 38 is an axial-sectional view of the seventh embodiment of the illuminator included in the image display apparatus in FIG. 6.

Referring now to FIGS. 37A and 38, there are schematically illustrated in the form of an axial-sectional view the seventh and eighth embodiments of the image display apparatus according to the present invention. Each image display apparatus may additionally include a P-S converter 40 and have the modulator 31 formed from color filter layers each made of an interference filter and located corresponding to each pixel, as shown in FIGS. 37A and 38. The image display apparatus includes the light source 24 with the parabolic mirror 7, fly-eye integrator 2, reflector 14 having an aperture pattern, P-S converter 40, condenser lens 10, field lens 11 and modulator 31 located in this order. It should be noted that FIG. 37A shows an axial-section of the illuminator horizontally viewed and FIG. 37B shows an axial-section vertically viewed. As shown in FIG. 37B, the modulator 31 is laid obliquely in relation to the optic axis.

Figure 1:
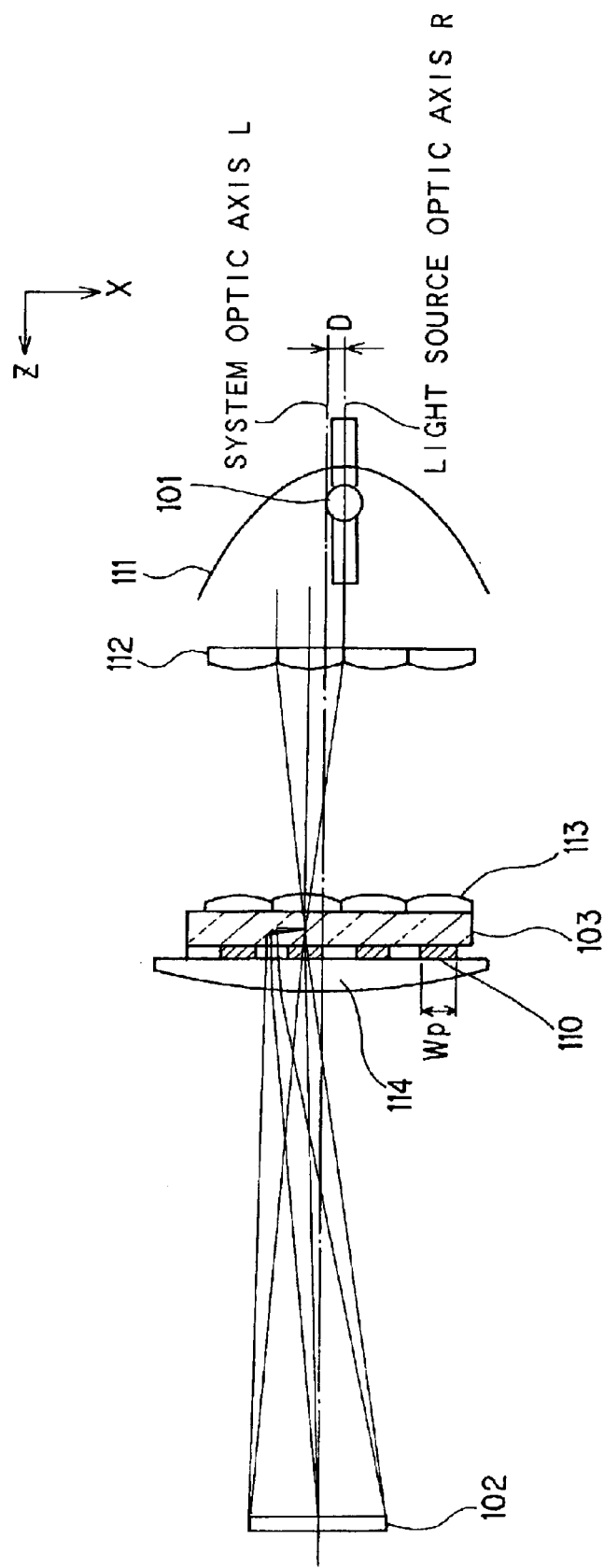
FIG. 1 is an axial-sectional view of the conventional image display apparatus.
Figure 2:
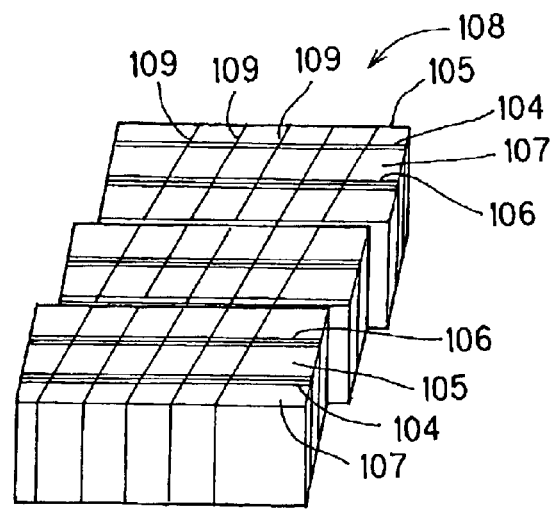
FIG. 2 is a perspective view of a P-S converter used in the conventional image display apparatus in FIG. 1.
Figure 3:
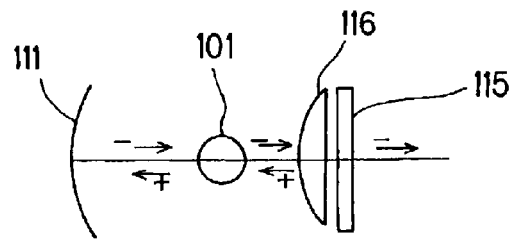
FIG. 3 is an axial-sectional view of a first example of the illuminator used in the conventional image display apparatus in FIG. 1.
Figure 4:
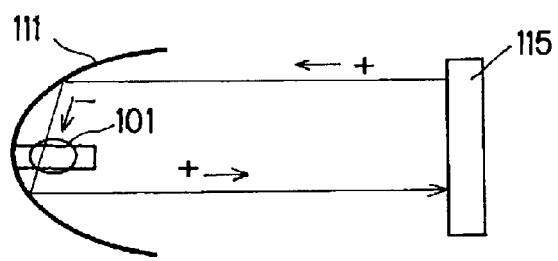
FIG. 4 is an axial-sectional view of a second example of the illuminator used in the conventional image display apparatus in FIG. 1.
Figure 5:
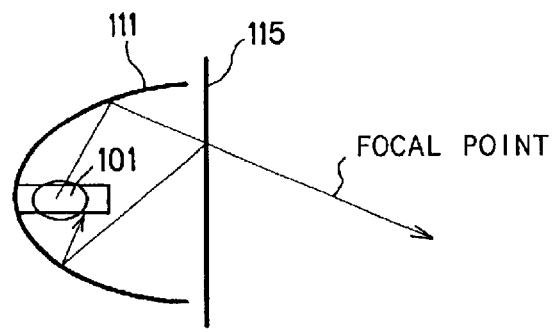
FIG. 5 is also an axial-sectional view of a third example of the illuminator used in the conventional image display apparatus in FIG. 1.

As having previously been described with reference to FIG. 2, the P-S converter 40 is formed as follows. Namely, a glass block is prepared by attaching glass plates each having formed thereon a polarized component separating layer formed from a multilayer film of an inorganic substance and glass plates each having a reflecting surface formed thereon alternately to each other, and the thus formed glass block is sliced along cutting planes being at an angle to the joined surfaces of the glass plates. The slice is used as the P-S converter 40. When a light beam of a mixture of P- and S-polarized components is incident upon the P-S converter 40, the P- and S-polarized components are separated at the polarized component separating layer. Namely, the P- and S-polarized components are separated at each layer of the P-S converter 40 and go out of the latter. By placing a half-wave ($\lambda/2$) plate at the side of the P-S converter 40, corresponding to the P- or S-polarized component and from which the light goes out, a light beam including solely either the P- or S-polarized component can be provided.

Figure 39:
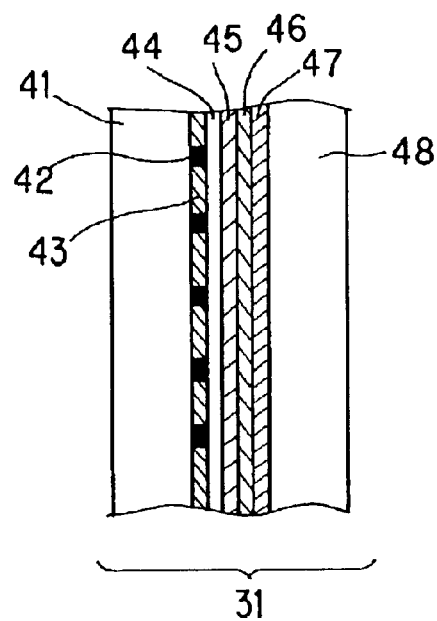
FIG. 39 is an axial-sectional view of the optical modulator in the seventh embodiment of the illuminator included in the image display apparatus in FIG. 6, showing the principal part thereof.

As shown in FIG. 39, the modulator 31 includes a transparent substrate 41, a layer in which reflecting shading layers 42 and reflective color filters 43 are alternately arranged, a transparent electrode 44, an oriented layer 45, a liquid crystal layer 46, an oriented layer 47 and an oriented TFT substrate 48 located in this order. The reflective color filter 43 is an interference filter or the like to allow predetermined color light to pass through and reflect unwanted color light other than the predetermined color light without absorbing them.

In the image display apparatus, the reflective color filter 43 and reflective shading layer 42 work as the first reflecting element. These reflective color filter 43 and reflective shading layer 42, and also the modulator 31, are laid obliquely in relation to the optic axis. The reflective color filter 43 and reflective shading layer 42 are oblique in a direction rotated about a direction perpendicular to the length of the attachment surface of the P-S converter 40.

In this image display apparatus, unwanted component of the primary light emitted from the light source 24 and not passed through each reflective color filter 43 is reflected by the reflective color filter 43 and reflective shading layer 42. For example, the color filter for R (red) reflects B (blue) and G (green) color light which will return as recycled light to the reflector 14. This is also true for the color filters for the other colors. The light beam having thus returned to the reflector 14 and reflected by the latter is incident again upon a position symmetric with respect to the optic axis of the modulator 31. At this time, the recycled light will not always return to the filter for the same color as that when the light has been reflected as the unwanted light. So, the illumination light is recycled.

Note that in the illuminators shown in FIGS. 37A and 38, the P-S converter 41 is of a conventional construction but it may be a reflecting polarizer. In this case, the reflecting polarizer should be laid with the oblique direction thereof being perpendicular to that of the layer including the reflective color filter and reflective shading layer (namely, the oblique direction of the modulator 31). Also, use of a light source with a quarter-wave plate divided into plural radial zones (even number of radial zones) symmetric with respect to the optic axis makes it unnecessary to use any P-S converter. Since use of a P-S converter will not increase the Etendue of the modulator in this case, the reflection by the reflective color filter improves the efficiency of light recycling. That is, the above illuminator will be effective when the modulator has no sufficient Etendue.

Also, the oblique setting of the modulator will result in that the modulator is set obliquely in relation to the optic axis of a projection lens (not shown) which forms the image of the modulator on the screen. If the oblique setting of the modulator in relation to the optic axis of the projection lens degrades the imaging characteristic on the screen, the optic axis of the projection lens may be set oblique correspondingly to the oblique angle of the modulator.

Further, the reflective color filter may be made of a cholesteric liquid crystal polymer layer of which the helical pitch is adjusted correspondingly to each pixel.

[Construction of the Illuminator for the Reflecting Modulator with the Reflective Color Filter]

Figure 40:
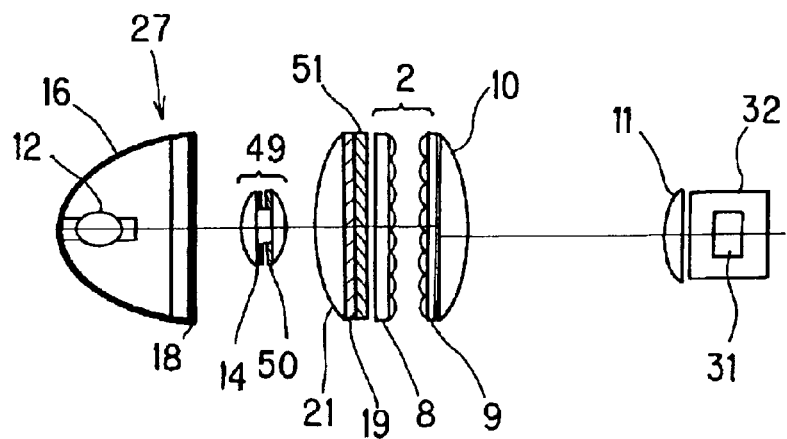
FIG. 40 is an axial-sectional view of an eighth embodiment of the illuminator included in the image display apparatus in FIG. 6.

Referring now to FIG. 40, there is schematically illustrated in the form of an axial-sectional view the eighth embodiment of the image display apparatus according to the present invention. As shown, the image display apparatus includes the illuminator 27 with the spheroidal mirror 16 and quarter-wave plate 18 divided into plural (an even number of) radial zones symmetric with respect to the optic axis, relay lens block 49 consisting of two pieces between them a toroidal reflector 14 having a central opening and a quarter-wave plate 50, field lens 21, reflecting circular polarizer 19, quarter-wave reflector 51, fly-eye integrator 2, condenser lens 10, field lens 11 and polarization beam splitter 32 laid in this order.

In this image display apparatus, the optic axis of the optical system laid downstream of the field lens 11 is laid obliquely in relation to that of the optical system laid down to the condenser lens 10. In addition, there is provided at the lateral side of the polarized bam splitter 32 the reflecting modulator 31 formed from an interference filter whose color filter layers are laid correspondingly to pixels.

In the above image display apparatus, S-polarized light from the reflecting plane of the polarization beam splitter 32 illuminates the modulator 31 which will provide a modulated P-polarized light. The P-polarized light is passed through the polarization beam splitter 32 and projected onto a projection lens (not shown).

Figure 41:
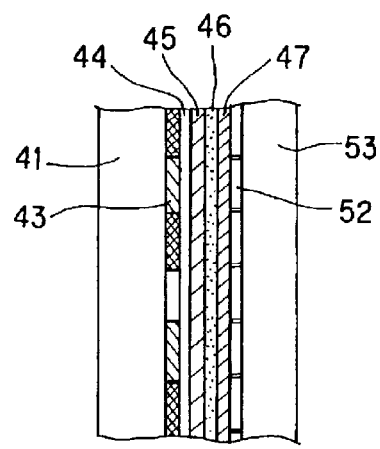
FIG. 41 is an axial-sectional view of the optical modulator in the eighth embodiment of the illuminator included in the image display apparatus in FIG. 6, showing the principal part thereof.

As shown in FIG. 41, the modulator 31 in this image display apparatus is constructed out of a substrate 41, reflective color filter 43, transparent electrode 5244, oriented layer 45, liquid crystal layer 46, oriented layer 47, reflective electrode and an active matrix substrate 53 provided in this order.

Figure 42:
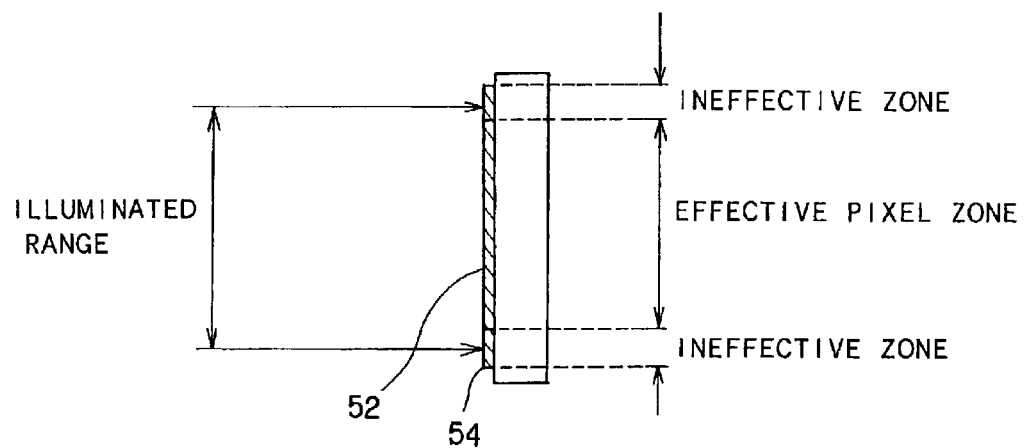
FIG. 42 is a side elevation of the optical modulator in the eighth embodiment of the illuminator included in the image display apparatus shown in FIG. 6, showing the configuration of one pixel area thereof.

Also, in the modulator 31, the reflective electrode 52 should desirably formed correspondingly to the effective pixel range and a reflector 54 desirably be formed in the ineffective range along the effective pixel range, as shown in FIG. 42. The range in which the modulator 31 is to be illuminated is generally defined large than the effective matrix range for the tolerance of assembling precision. Also, by forming the reflector 54 to be larger than the range of illumination, it is also possible to recycle the illumination light projected upon the ineffective range other than the display range.

In the image display apparatus, the reflective color filter 43, reflective electrode 52 and reflector 54 work together as the first reflecting element. This embodiment is intended for an improved efficiency of color utilization as well as for an improved peak brightness.

In the image display apparatus, the light beam emitted from the lamp bulb 12 in the light source 27 is polarized in a constant direction by the polarized-state converting function of the light source 27, namely, S-polarized in relation to the reflecting plane of the polarization beam splitter 32 to illuminate the modulator 31.

The primary light emitted from the light source 27 has the unwanted light, included therein and not passing through the reflective color filter 43 in the modulator 31, reflected by the color filter 43. For example, the color filter for R (red) reflects B (blue) and G (green) color light. These reflected color light beams return to the reflector 14. The light incident upon the reflector 14 passes through the quarter-wave plate 50 on the reflector 14 which will linearly polarize the light. The recycled light reflected by the reflector 14 passes, as a circularly polarized light, through the reflecting circular polarizer 19. The recycled light is incident again upon the reflective color filter 43. At this time, the recycled light will not always return to the filter for the same color light as those reflected as the unwanted light. Thus, the light is recycled.

Similarly, the light not modulated by the modulator 31 is returned to the reflector 14 where it will be uniformed to illuminate the entire modulator 31. The light reflected again by the reflective color filter 43 and light not modulated pass through the central opening of the reflector 14 and return to the light-emission point of the light source 27.

Also, of the light emitted from the light source 27 and incident upon the reflecting circular polarizer 19, a circularly polarized in a direction in which it is reflected by the reflecting circular polarizer 19 is reflected by the reflecting circular polarizer 19 and returns again to the light-emission point of the light source 27. When the light is incident again upon the reflecting circular polarizer 19, it has been circularly polarized in a direction in which will pass through the reflecting circular polarizer 19. When it passes trough the reflecting circular polarizer 19 and also through the quarter-wave plate 51, it is S-polarized in relation to the reflecting plane of the polarization beam splitter 32 to illuminate the modulator 31. With the above process repeatedly done, the light is recycled with an improved efficiency.

[Construction of the Recycle-type Sequential Color Image Display Apparatus]

Figure 43:
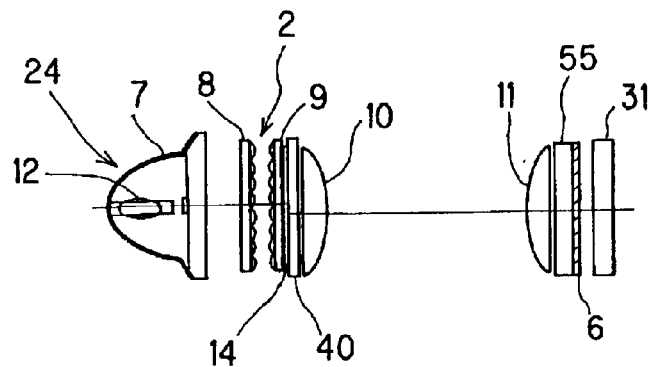
FIG. 43 is an axial-sectional view of a ninth embodiment of the illuminator included in the image display apparatus in FIG. 6.

Referring now to FIG. 43, there is schematically illustrated in the form of an axial-sectional view, the ninth embodiment of the image display apparatus according to the present invention. As shown, the image display apparatus may be constructed out of the light source 24 with the parabolic mirror 7, fly-eye integrator 2, reflector 14 having an opening formed therein, P-S converter 40, condenser lens 10, field lens 11, sequential color shutter 55, reflecting polarizer 6 and modulator 31 located in this order as shown in FIG. 43. In this image display apparatus, the optic axis of the optical system laid downstream of the condenser lens 10 is laid shifted in parallel to that of the optic axis of the optical system ranging from the light source 24 to the reflector 14.

In this image display apparatus, a single-plate color display is implemented as in the aforementioned embodiment and the color display is made by the use of a sequential color display. That is, the sequential color shutter 55 uses th reflecting polarizer 6 as an analyzer therefor. In this illumination optical system, unwanted light not related with the image display at each time point is reflected by the reflecting polarizer 6 to return the light to the reflector 14, whereby it is made possible to recycle the illumination light.

[Construction of the Illuminator for an Improved Peak Brightness (1)]

Figure 44A:
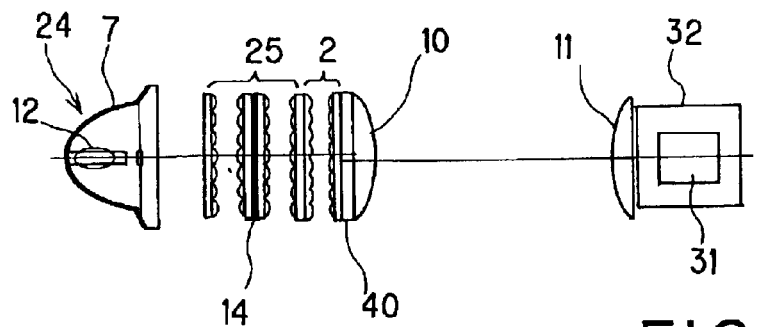
FIG. 44A is an axial-sectional view of a tenth embodiment of the illuminator included in the image display apparatus in FIG. 6.

Referring now to FIG. 44A, there is schematically illustrated in the form of an axial-sectional view the tenth embodiment of the image display apparatus according to the present invention. As shown, this image display apparatus may include two fly-eye integrator groups 2 and 25. In this case, the uniformity of the recycled light can be improved.

Figure 44B:
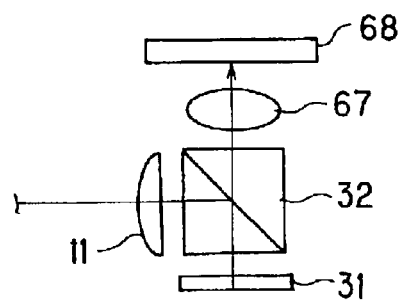
FIG. 44B shows the principle of the illuminator in FIG. 44A.

More specifically, the image display apparatus includes, as shown in FIG. 44A, the light source 24 with the parabolic mirror 7, fly-eye integrator 25, reflector 14, fly-eye integrator 2, P-S converter 40, condenser lens 10, field lens 11 and polarization beam splitter 32 located in this order, and also the modulator (reflective liquid crystal polymer-made modulator) 31 provided at the lateral side of the polarization beam splitter 32. The light passed through the polarization beam splitter 32 via the modulator 31 is projected by a projection lens 67 onto a screen 68 as shown in FIG. 44B.

The first fly-eye integrator 2 is formed from an element having a similar shape to that of the to-be-illuminated object. The second fly-eye integrator 25 disposed between the first fly-eye integrator 2 and light source 24 may be different in shape from the first fly-eye integrator 2.

The second fly-eye integrator 25 forms the relay-condenser illumination system, and the reflector 14 as the second reflecting element is laid in a zone near the aperture and where it will not shade the primary light.

Also, the optic axis of the optical system laid downstream of the condenser lens 10 is shifted by about a quarter of the element pitch of the first fly-eye integrator 2 in parallel to that of the rest of the optical system. Further, the element pitch of the first fly-eye integrator 2 is set different from that of the second fly-eye integrator 25.

In the image display apparatus, the recycled light returning to the light source 24 after passing through the modulator 31 forms a pattern of reflected light on each element of the first fly-eye lens 8 of the first fly-eye integrator 2. Since the element pitch of the second fly-eye integrator 25 is different from that of the first fly-eye integrator 2, the recycled light is incident upon the reflector 14, reflected by the latter, and incident again upon the first fly-eye lens 8 of the first fly-eye integrator 2. At this time, the recycled light will form a pattern different from that formed when it has initially returned to the first fly-eye lens 8. Therefore, the recycled light passes through the first fly-eye integrator 2, and is incident upon the first reflecting element 6. At this time, the light has an uniformed intensity.

In this image display apparatus, there may be provided a color separation/recombination prism to display an image in colors, or a color filter as in the aforementioned embodiment. The optic axis of the optical system laid downstream of the condenser lens 10 should desirably be disclosed in a direction in which the distance between the field lens 21 and the reflecting plane of the polarization beam splitter 32 will not be changed by shifting the optic axis. This is intended to allow an increase of the angle of light beam incidence, corresponding to the shift of the optic axis.

Figure 45A:
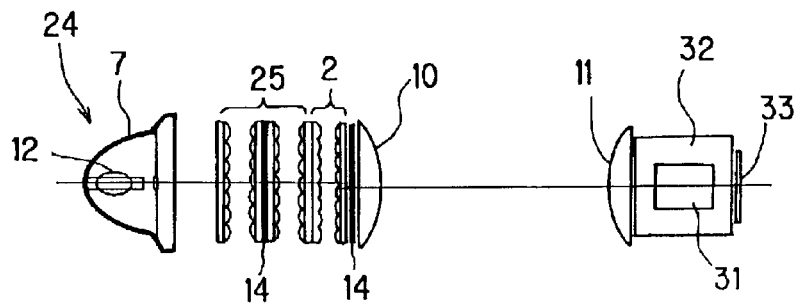
FIG. 45A is an axial-sectional view of an eleventh embodiment of the illuminator included in the image display apparatus in FIG. 6.
Figure 45B:
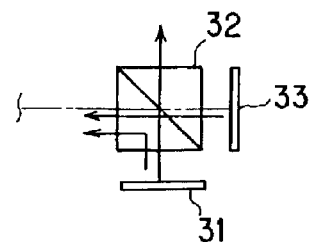
FIG. 45B shows the principle of the illuminator in FIG. 45A.

Also, the P-S converter 40 may be replaced with another polarized-state converter. For example, there may be provided the reflector 33 to reflect the light coming from the field lens 11 and passed through the polarization beam splitter 32 and there may also be provided the reflector 14 between the fly-eye integrator 2 and condenser lens 10, as shown in FIGS. 45A and 45B. The reflector 33 is laid obliquely in relation to the optic axis. The reflector 33 is set obliquely in a direction perpendicular to the direction of shifting the optic axis of the optical system laid downstream of the condenser lens 10.

Further, by using a light source with a quarter-wave plate divided into plural (an even number of) radial zones symmetric with respect the optic axis, it is made unnecessary to use any P-S converter. In this case, since the Etendue will not be increased by the use of a P-S converter, the reflection of the illumination light by the reflective color filter will improve the efficiency of light recycling. That is, this measure is effective when the modulator has no sufficient Etendue.

In the image display apparatus, the illumination not modulated by the modulator 31 returns as recycled light to the light source 24 through the polarization beam splitter 32. The recycled light reflected at the reflector 14 is uniformed by the fly-eye integrator 2 to uniformly illuminate the modulator 31.

Figure 46:
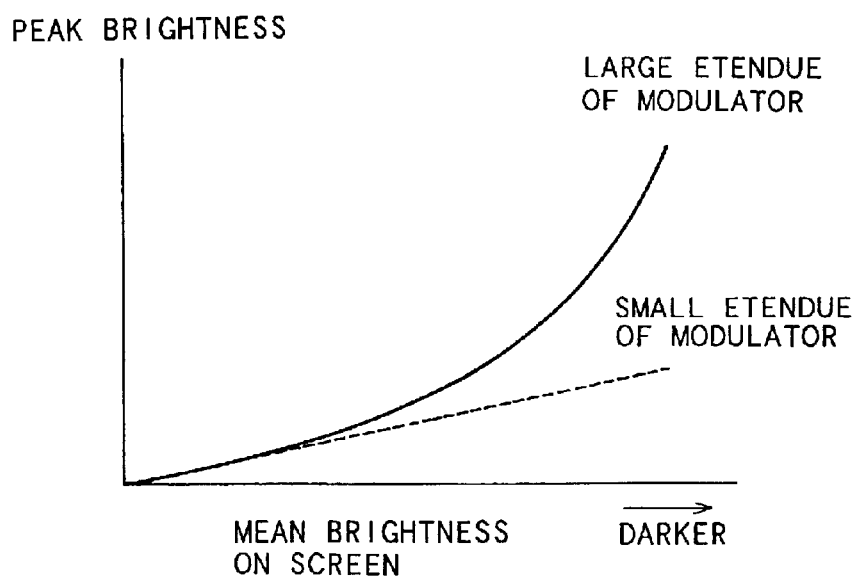
FIG. 46 graphically shows the variation in peak intensity of a displayed image in an eleventh embodiment of the illuminator included in the image display apparatus in FIG. 36.

Also in the above case, a bright zone within a dark displayed image can be displayed brighter. FIG. 46 graphically shows the variation in peak intensity of a displayed image in the eleventh embodiment of the image display apparatus according to the present invention. As shown, the relation between the mean brightness and peak brightness is such that the larger the Etendue of the modulator, the larger number of times the light can be recycled and the lower the mean brightness of the display screen, the brighter the bright zone depicting an exponential ascending curve. Since the black level increases at the same rate, the contrast of the image display apparatus itself will not change. However, in case the contrast of the apparatus as a projector depends upon the increase of the black level due to the reflection of external light, it is improved.

Note that generally, also in an illuminator including the reflecting modulator and polarization beam splitter, the unwanted light will return to the light source but if there is not any means for recycling the unwanted light by returning the light to the modulator positively and efficiently, the light cannot be recycled effectively.

[Construction of the Illuminator for Improved Peak Brightness (2)]

Figure 47:
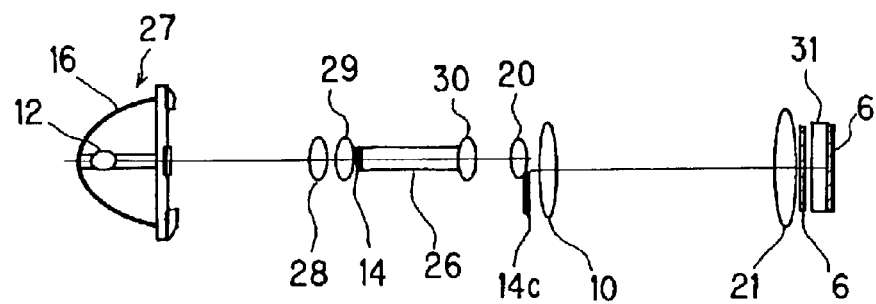
FIG. 47 is an axial-sectional view of a twelfth embodiment of the illuminator in the image display apparatus in FIG. 6.

Referring now to FIG. 47, there is schematically illustrated in the form of an axial-sectional view the twelfth embodiment of the image display apparatus according to the present invention. As shown, the image display apparatus includes the light source 27 with the spheroidal mirror 16, relay lens 28, field lens 29, reflector 14 having an opening formed therein, rod integrator 26, condenser lens 30, relay lens 20, reflector 14c, condenser lens 10, field lens 21, reflecting polarizer 6, transmissive modulator 31, and another reflecting polarizer 6 as an analyzer, located in this order. The optic axis of the optical system laid downstream of the condenser lens 10 is shifted in parallel to that of the optical system ranging from the light source 27 to the relay lens 20.

In this image display apparatus, the light source 27 and reflecting polarizer 6 provide the function to convert the polarized state of light. As in the aforementioned embodiment, the reflecting polarizer 6 is formed from a cholesteric liquid crystal polymer-made circular polarizer.

The illumination light emitted from the light source 27 passes through the relay lens 28, field lens 29, rod integrator 26, condenser lens 30, relay lens 20, condenser lens 10 and field lens 21 and incident upon the reflecting polarizers 6. One circularly polarized light passes through these reflecting polarizers 6 while the other circularly polarized light is reflected by the reflecting polarizers 6. The reflected light is incident upon the reflector 14c, and reflected by the latter to be an opposite-directional circularly polarized light. This light is incident again upon the reflecting polarizer 6 and passes through the latter. The light thus passed through the reflecting polarizer 6 is incident upon the modulator 31 in which it will undergo spatial modulation according to an image to be displayed.

Figure 49:
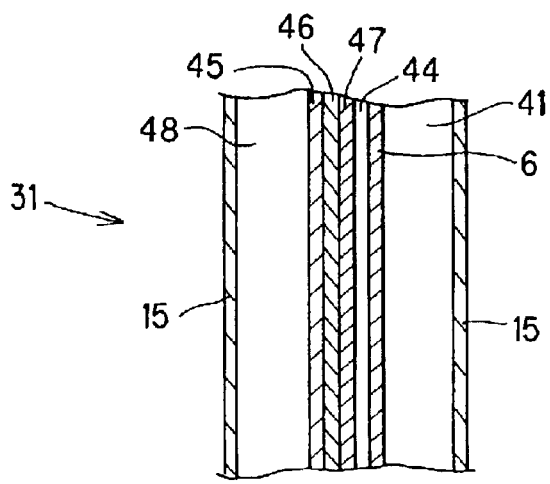
FIG. 49 is an axial-sectional view of the optical modulator in each of the eleventh and twelfth embodiments of the illuminator, respectively, included in the image display apparatus in FIG. 6.

The reflecting polarizer 6 as the analyzer in the image display apparatus is a cholesteric liquid crystal polymer-made circular polarizer formed within the modulator as shown in FIG. 49. As shown, the modulator 31 includes a TFT substrate 48, oriented layer 45, liquid crystal layer 46, oriented layer 47, transparent electrode 44, reflecting polarizer 6 and substrate 41 laid in this order. In addition, the modulator 31 has an anti-reflection coating 15 formed on either side thereof. The reflecting polarizers 6 laid before and after the modulator 31 are opposite in direction of helicity to each other.

In the image display apparatus, the light beam not modulated by the modulator 31 passes the latter, is reflected by the reflecting polarizer 6 and incident upon the rod integrator 26 or reflector 14c. The light beam reflected by the reflector 14c becomes a counter-torsional circularly polarized light, is reflected by the reflecting polarizer 6, and then incident upon the rod integrator 26. The light is uniformed by the rod integrated 26, and is partially reflected by the reflector 14 provided along the opening at the end of the light source 27 while the rest of the light is returned to the light source 27. The recycled light is uniformed by the rod integrator 26, and changed in polarized state to uniformly illuminate the modulator 31.

In this image display apparatus, the liquid crystal polymer forming the modulator works in the VA mode. However, by providing a quarter-wave plate between the cholesteric liquid crystal polymer-made circular polarizer and liquid crystal layer to linearly polarize the light, the modulator may be caused to work in the TN mode or the like for the linearly polarized light.

Figure 48:
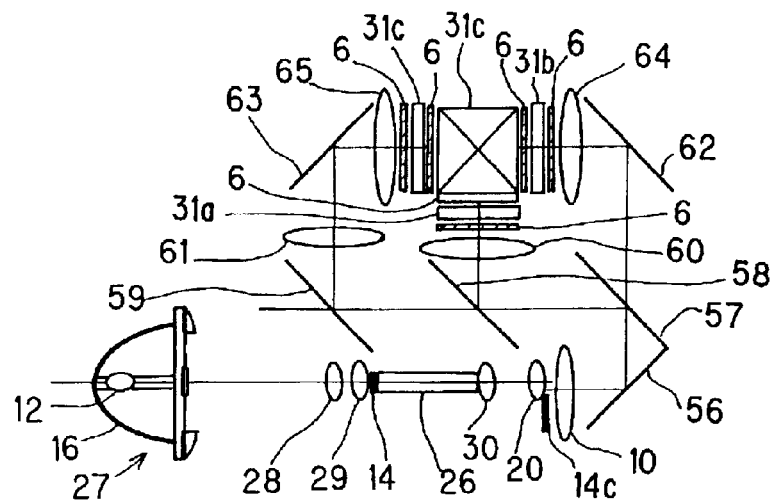
FIG. 48 is an axial-sectional view of a thirteenth embodiment of the illuminator included in the image display apparatus in FIG. 6.

Referring now to FIG. 48, there is schematically illustrated in the form of an axial-sectional view the thirteenth embodiment of the image display apparatus according to the present invention. As shown, the image display apparatus may include three modulators 31a, 31b and 31c. That is, the image display apparatus includes the light source 27 with the spheroidal mirror 16, relay lens 28, field lens 29, reflector 14 having an opening formed therein, rod integrator 26, condenser lens 30, relay lens 20, reflector 14c and condenser lens 10 provided in this order. In this image display apparatus, an illumination optical system is formed from the above components with the optic axis of the condenser lens 10 being shifted in parallel to that of the optical system ranging from the light source 27 to the relay lens 20, to guide the outgoing light from the optical system to a first spectral reflecting mirror 57 via a mirror 56.

The first spectral reflecting mirror 57 allows the R (red) light to pass through while reflecting the G (green) and B (blue) light, for example. The R (red) light is reflected by a mirror 62, passes through a relay lens 64, reflecting polarizer 6, transmissive modulator 31b and reflecting polarizer 6 as an analyzer, and is incident upon a recombining prism 66. The G (green) and B (blue) light rays are incident upon a second spectral reflecting mirror 58 where the G (green) light is allowed to pass through while the B (blue) light is reflected. The G (green) light passes through a relay lens 60, reflecting polarizer 6, transmissive modulator 31a and reflecting polarizer 6 as the analyzer, and is incident upon the recombining prism 66. The B (blue) light passes through a relay lens 61 and is reflected bu a mirror 63, passes through a relay lens 65, reflecting polarizer 6, transmissive modulator 31c and the reflecting modulator 6 as an analyzer, and is incident upon the recombination prism 66.

At the recombination prism 66, the R (red), G (green) and B (blue) light rays are recombined and projected towards a projection lens (not shown). The light is projected through the projection lens onto the screen.

In the aforementioned embodiments of the present invention, the modulator is formed from a liquid crystal. The light modulated by the modulator is projected onto the screen through the projection lens (not shown). The material of the modulator is not limited to the liquid crystal but may be formed from any other suitable material. For improvement of the efficiency of light recycling, the construction of the illumination optical system is not limited to the aforementioned ones but it may be a one including a reflecting means provided in an optimum position of the light source and which would be able to improve the efficiency of light recycling.

As having been described in the foregoing, the present invention provides inexpensive separation and recombination of polarized components of a light beam by means of a light source and illuminator, which work together to efficiently recycle unwanted light in the projector. Also, in case the single-plate modulator using a color filter is used, the light can be utilized with an improved efficiency. Also, use of the sequential color-type single-plate modulator permits to improve the efficiency of light utilization. Further, the efficiency of light utilization of an modulator having a low numerical aperture can be improved, so that the peak brightness on a dark screen can be elevated.

That is, the present invention provides an image display apparatus including including a non-luminous modulator, illuminator to illuminate the modulator and a projection lens, and which is simply constructed and thus easy to produce and can utilize light with an improved efficiency.

What is claimed is:

1. A projection-type image display apparatus including an illuminator with a light source, optical modulator illuminated by light from the illuminator and which makes spatial modulation of the illumination light according to a to-be-displayed image for either transmission or reflection, and a projection lens to form an image of the optical modulator, the apparatus comprising:
   a first reflecting element to reflect, towards the light source, an unwanted one of a light beam emitted from the illuminator and that will not illuminate the optical modulator; and
   a second reflecting element to guide, by reflecting, the unwanted light once reflected by the first reflecting element to the optical modulator;
   wherein the light source is a discharge lamp formed from a glass tube having an anti-reflection coating formed on at least a part of the surface thereof.

2. A projection-type image display apparatus including an illuminator with a light source, optical modulator illuminated by light from the illuminator and which makes spatial modulation of the illumination light according to a to-be-displayed image for either transmission or reflection, and a projection lens to form an image of the optical modulator, the apparatus comprising:
   a first reflecting element to reflect, towards the light source, an unwanted one of a light beam emitted from the illuminator and that will not illuminate the optical modulator; and
   a second reflecting element to guide, by reflecting, the unwanted light once reflected by the first reflecting element to the optical modulator;
   wherein the illuminator includes an illumination optical system to guide the light beams emitted from the light source to the optical modulator; the first reflecting element is positioned in a plane including a point generally conjugate with a point of light emission of the light source with the illumination optical system being laid between them not to shade the illumination light traveling from the light-emission point to the optical modulator; the illumination optical system includes an integrator to create a more uniform light intensity distribution within the light beam and a relay-condenser optical system laid between the integrator and light source; and the second reflecting element is positioned near the relay-condenser optical system not to shade the illumination light traveling from the light source to the optical modulator.

3. The apparatus as set forth in claim 2, wherein the first reflecting element is positioned obliquely in relation to the optic axis of the illumination optical system.

4. A projection-type image display apparatus including an illuminator with a light source, optical modulator illuminated by light from the illuminator and which makes spatial modulation of the illumination light according to a to-be-displayed image for either transmission or reflection, and a projection lens to form an image of the optical modulator, the apparatus comprising:
   a first reflecting element to reflect, towards the light source, an unwanted one of a light beam emitted from the illuminator and that will not illuminate the optical modulator; and a second reflecting element to guide, by reflecting, the unwanted light once reflected by the first reflecting element to the optical modulator;
   wherein the illuminator includes an illumination optical system to guide the light beam emitted from the light source to the optical modulator;
   the illumination optical system includes an integrator to uniform the light intensity distribution within the light beam; and
   the optic axis of the optical system laid downstream of the integrator is shifted in parallel to that of the optical system ranging from the light source to the integrator.

5. The apparatus as set forth in claim 4, wherein the first reflecting element is positioned between the light source and integrator not to shade the illumination light traveling from the light source to the optical modulator.

6. A projection-type image display apparatus including an illuminator with a light source, optical modulator illuminated by light from the illuminator and which makes spatial modulation of the illumination light according to a to-bedisplayed image for either transmission or reflection, and a projection lens to form an image of the optical modulator, the apparatus comprising:

a first reflecting element to reflect, towards the light source, an unwanted one of a light beam emitted from the illuminator and that will not illuminate the optical modulator; and a second reflecting element to guide, by reflecting, the unwanted light once reflected by the first reflecting element to the optical modulator;

wherein the illuminator includes an illumination optical system to guide the light beam emitted from the light source to the optical modulator;

the illumination optical system includes a rod integrator as the integrator to uniform the light intensity distribution within the light beam; and the second reflecting element is positioned near the light-incident end face of the rod integrator not to shade the illumination light traveling from the light source to the optical modulator.

7. A projection-type image display apparatus including an illuminator with a light source, optical modulator illuminated by light from the illuminator and which makes spatial modulation of the illumination light according to a to-be-displayed image for either transmission or reflection, and a projection lens to form an image of the optical modulator, the apparatus comprising:

a first reflecting element to reflect, towards the light source, an unwanted one of a light beam emitted from the illuminator and that will not illuminate the optical modulator; and a second reflecting element to guide, by reflecting, the unwanted light once reflected by the first reflecting element to the optical modulator;

wherein the illuminator includes an illumination optical system to guide the light beam emitted from the light source to the optical modulator;

the illumination optical system includes a rod integrator as the integrator to uniform the light intensity distribution within the light beam, and a condenser lens to form an image of the rod integrator; and the optic axis of the optical system ranging from the light source to the rod integrator is shifted in parallel to that of the optical system laid downstream of the condenser lens.

8. The apparatus set forth in claim 7, wherein the first reflecting element is positioned between the rod integrator and condenser lens not to shade the illumination light traveling from the light source to the optical modulator.

9. A projection-type image display apparatus including an illuminator with a light source, optical modulator illuminated by light from the illuminator and which makes spatial modulation of the illumination light according to a to-be-displayed image for either transmission or reflection, and a projection lens to form an image of the optical modulator, the apparatus comprising:

a first reflecting element to reflect, towards the light source, an unwanted one of a light beam emitted from the illuminator and that will not illuminate the optical modulator; and a second reflecting element to guide, by reflecting, the unwanted light once reflected by the first reflecting element to the optical modulator; and a sequential color shutter;

wherein the first reflecting element also serves as an analyzer of the sequential color shutter.

10. A projection-type image display apparatus including an illuminator with a light source, optical modulator illuminated by light from the illuminator and which makes spatial modulation of the illumination light according to a to-be-displayed image for either transmission or reflection, and a projection lens to form an image of the optical modulator, the apparatus comprising:

a first reflecting element to reflect, towards the light source, an unwanted one of a light beam emitted from the illuminator and that will not illuminate the optical modulator; and a second reflecting element to guide, by reflecting, the unwanted light once reflected by the first reflecting element to the optical modulator;

wherein the illuminator includes a discharge lamp as a light source and a reflector having the sectional form of a paraboloid of revolution, and a phase-difference plate and a reflecting polarizer are provided in the optical path between the discharge lamp and optical modulator, wherein the phase-difference plate is divided along radial boundary lines concentric to the center axis of the reflector into plural zones whose retardation axes extend in different directions.

11. The apparatus as set forth in claim 10, wherein retardation axes of those zones of the phase-difference plate which are phase-retardation axis with respect to the center axis of the reflector, extend perpendicular to each other.

* * * * *